United States Patent
Hu et al.

(10) Patent No.: US 12,037,244 B2
(45) Date of Patent: Jul. 16, 2024

(54) MICROWAVE CATALYSIS FOR MODULAR PRODUCTION OF CARBON NANOMATERIALS FROM NATURAL GAS

(71) Applicant: West Virginia University Board of Governors on Behalf of West Virginia University, Morgantown, WV (US)

(72) Inventors: Jianli Hu, Morgantown, WV (US); Changle Jiang, Morgantown, WV (US); Brandon Robinson, Morgantown, WV (US); Xinwei Bai, Morgantown, WV (US); I-Wen Wang, Morgantown, WV (US)

(73) Assignee: West Virginia University Board of Governors on Behalf of West Virginia University, Morgantown, WV (US)

( * ) Notice: Subject to any disclaimer, the term of this patent is extended or adjusted under 35 U.S.C. 154(b) by 0 days.

(21) Appl. No.: 17/307,863

(22) Filed: May 4, 2021

(65) Prior Publication Data

US 2021/0371277 A1    Dec. 2, 2021

Related U.S. Application Data

(60) Provisional application No. 63/020,933, filed on May 6, 2020.

(51) Int. Cl.
   *C01B 3/26*    (2006.01)
   *B01J 21/04*   (2006.01)
   (Continued)

(52) U.S. Cl.
   CPC .............. *C01B 3/26* (2013.01); *B01J 21/04* (2013.01); *B01J 21/185* (2013.01); *B01J 23/44* (2013.01);
   (Continued)

(58) Field of Classification Search
   CPC . C01B 3/26; C01B 32/162; C01B 2203/0277; C01B 2203/1052;
   (Continued)

(56) References Cited

U.S. PATENT DOCUMENTS 8,075,869 B2 * 12/2011 Zhu .......................... C01B 3/26
                                                      423/650

OTHER PUBLICATIONS

Wang et al (Effects of acidic treatments on the pore and surface properties of Ni catalyst supported on activated carbon, Carbon, 1998) (Year: 1998).*

(Continued)

*Primary Examiner* — Samir Shah
*Assistant Examiner* — Logan Edward LaClair
(74) *Attorney, Agent, or Firm* — Thomas | Horstemeyer, LLP

(57) ABSTRACT

In one aspect, the disclosure relates to $CO_2$-free and/or low-$CO_2$ methods of co-producing hydrogen and solid forms of carbon via natural gas decomposition using microwave radiation. The methods are efficient, self-sustaining, and environmentally benign. In a further aspect, the disclosure relates to recyclable and recoverable catalysts useful for enhancing the disclosed methods, wherein the catalysts are supported by solid forms of carbon. Methods for recycling the catalysts are also disclosed. This abstract is intended as a scanning tool for purposes of searching in the particular art and is not intended to be limiting of the present disclosure.

22 Claims, 14 Drawing Sheets

MW Reactor Modeling    Raman Spectroscopy

(51) Int. Cl.

| | | |
|---|---|---|
| B01J 21/18 | (2006.01) | |
| B01J 23/44 | (2006.01) | |
| B01J 23/75 | (2006.01) | |
| B01J 23/755 | (2006.01) | |
| B01J 35/23 | (2024.01) | |
| B01J 37/02 | (2006.01) | |
| B01J 37/03 | (2006.01) | |
| B01J 37/04 | (2006.01) | |
| B01J 37/06 | (2006.01) | |
| B82Y 30/00 | (2011.01) | |
| B82Y 40/00 | (2011.01) | |
| C01B 32/162 | (2017.01) | |

(52) U.S. Cl.
CPC ............ *B01J 23/75* (2013.01); *B01J 23/755* (2013.01); *B01J 35/23* (2024.01); *B01J 37/0236* (2013.01); *B01J 37/036* (2013.01); *B01J 37/04* (2013.01); *B01J 37/06* (2013.01); *C01B 32/162* (2017.08); *B82Y 30/00* (2013.01); *B82Y 40/00* (2013.01); *C01B 2203/0277* (2013.01); *C01B 2203/1052* (2013.01); *C01B 2203/1058* (2013.01); *C01B 2203/1064* (2013.01); *C01B 2203/1082* (2013.01); *C01B 2203/1241* (2013.01)

(58) Field of Classification Search
CPC .... C01B 2203/1058; C01B 2203/1064; C01B 2203/1082; C01B 2203/1241; C01B 2203/0855; C01B 2203/1088; C01B 2203/1094; B01J 21/04; B01J 21/185; B01J 23/44; B01J 23/75; B01J 23/755; B01J 35/0013; B01J 37/0236; B01J 37/036; B01J 37/04; B01J 37/06; B01J 35/002; B82Y 30/00; B82Y 40/00

See application file for complete search history.

(56) References Cited

OTHER PUBLICATIONS

Abandes, J.C. et al., "On the climate change mitigation potential of CO2 to fuels," 2017, Energy and Environmental Sci., 10:2491-2499.
Ago, H., et al., J. Phys. Chem. B, 2004, 108, 18908-18915.
Akcil, A., et al., Waste Management, 2015, 45, 420-433.
Bai, X., et al., "Microwave Catalytic Reactor for Upgrading Stranded Shale Gas to Aromatics," Fuel, 243, 485-492, 2019.
Balesini, A. A., et al., Int. J. Miner. Metall. Mater., 2013, 20, 1029-1034.
Bromberg, L., et al., "Plasma catalytic reforming of methane" Int. J. Hydrogen Energy 24 (1999) 1131-7.
Czernichowski, A. "Glidarc assisted preparation of the synthesis gas from natural and waste hydrocarbon gases," Oil Gas Sci. Technol. Rev. IFP 56 (2001) 181-98.
Dagle, R. et al., U.S. Dept of Energy Report "R&D Opportunities for Development of Natural Gas Conversion Technologies for Co-Production of Hydrogen and Value-Added Solid Carbon Products," ANL-17/11 | PNNL-26726 <https://www.pnnl.gov/main/publications/external/technical_reports/PNNL-26726.pdf> Accessed Apr. 30, 2020, 73pp.
Das, R., "Carbon Nanotube Purification," 2017, DOI: 10.1007/978-3-319-58151-4_3, 55-73.
Deminsky, M., et al., "Plasma-assisted production of hydrogen from hydrocarbons", Pure Appl. Chem. 74 (2002) 413-8.
Gao, B., et al., "Catalytic Performance and Reproducibility of Ni/Al2O3 and Co/Al2O3 Mesoporous Aerogel Catalysts for Methane Decomposition," Industrial & Engineering Chemistry Research, 58 (2), 798-807, 2018.
Hongo, H., et al., Chem. Phys. Lett., 2002, 361, 349-354.
Hou, P.-X., et al., Carbon, 2008, 46, 2003-2025.
Hu, J., et al., Separation and Purification Technology, 2012, 95, 136-143.
Hunt, J., et al., "Microwave-Specific Enhancement of the Carbon-Carbon Dioxide (Boudouard) Reaction," J. Phys. Chem. C, 117(51), 2013, 26871-26880.
Jung, Y. J., et al., J. Phys. Chem. B, 2003, 107, 6859-6864.
Kutteri, D.A., et al., "Methane Decomposition to Tip and Base Grown Carbon Nanotubes and COx free H2 over Mono and Bimetallic 3d Transition Metal Catalysts," Catalysis Science & Technology, 8, 858-869, 2018.
Li, W. Z., et al., Chem. Phys. Lett., 2003, 368, 299-306.
Microwave Chemical Co., Ltd., "Scaling Up of Microwave Reactor,".
Muradov, N.Z., "CO2-free production of hydrogen by catalytic pyrolysis of hydrocarbon fuel," Energ. Fuel, 12 (1998) 41-48.
Parija, C. , et al., Hydrometallurgy, 1998, 49, 255-261.
Petitpas, G., et al., "A comparative study of non-thermal plasma assisted reforming technologies", Int. J. Hydrogen Energy 32 (2007) 2848-67.
Pirard, S. L. et al., Front. Chem. Sci. Eng., 2017, 11, 280-289.
Rao, R., et al., ACS Nano, 2018, 12, 11756-11784.
Rzelewska-Piekut, M., et al., Separation and Purification Technology, 2019, 212, 791-801.
Sahu, K. K., et al., Journal of Environmental Management, 2013, 125, 68-73.
Salameh, S. et al, "Advances in scalable gas-phase manufacturing and processing of nanostructured solids: a review," Particuology, 2017, 30:15-39.
Shelimov, K. B., et al., Chemical Physics Letters, 1998, 282, 429-434.
Sobacchi, M., et al., "Experimental assessment of a combined plasma/catalytic system for hydrogen production via partial oxidation of hydrocarbon fuels" Int. J Hydrogen Energy 27 (2002) 635-42.
Lyudmila V. Tabulina, Tamara G. Rusalskaya, Boris G. Shulitsky, Ivan Komissarov, Yuri P. Shaman, and Anatoliy G. Carosa, "Purification features of carbon nanotubes from impurities after their synthesis" Izvestiya Vysshikh Uchebnykh Zavedeniy Khimiya Khimicheskaya Tekhnologiya (2017) 60(6):89 DOI: http://doi.org/10.6060/tcct.2017606.5539.
Upham, D.C. et al., Science, 2017, 358:917-921.
Wang, I-W., et al., "Methane Pyrolysis for Carbon Nanotubes and COx Free H2 over Transition-Metal Catalysts," Energy & Fuels, 2019, 33:197-205.
Ward, J. W., et al., Chem. Phys. Lett., 2003, 376, 717-725.

* cited by examiner

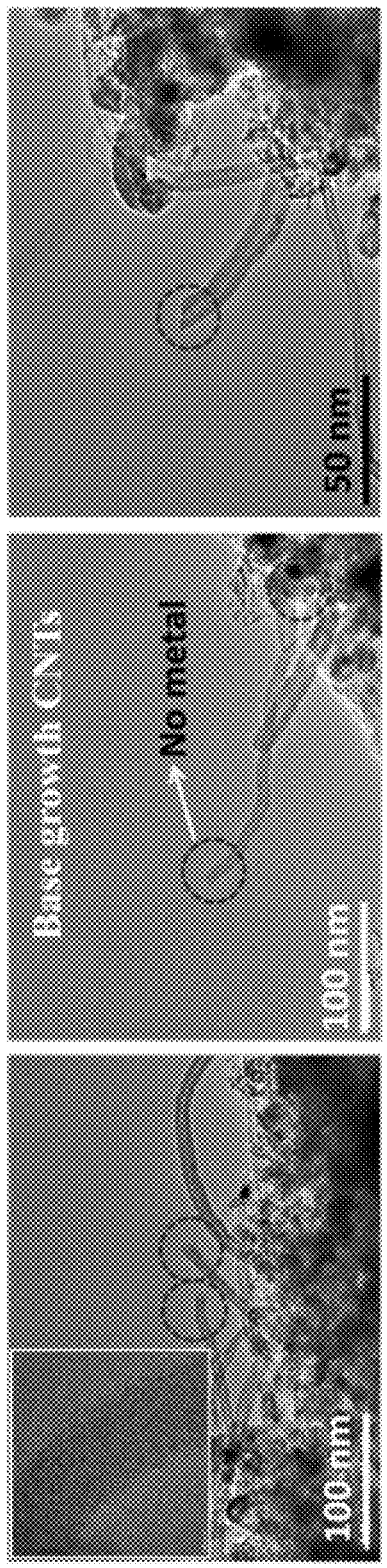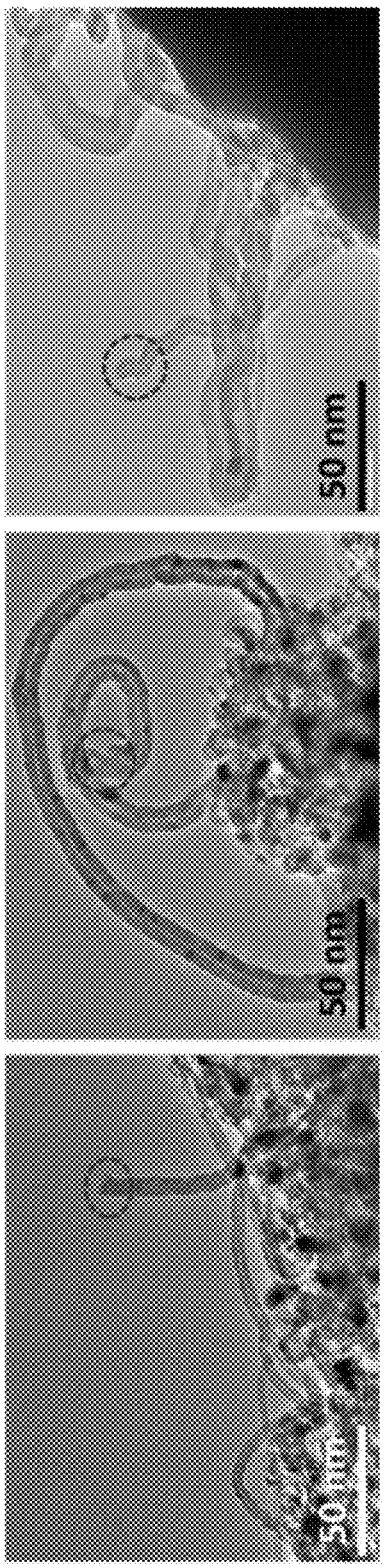

MICROWAVE CATALYSIS FOR MODULAR PRODUCTION OF CARBON NANOMATERIALS FROM NATURAL GAS

CROSS-REFERENCE TO RELATED APPLICATIONS

This application claims the benefit of U.S. Provisional Application No. 63/020,933, filed on May 6, 2020, which is incorporated herein by reference in its entirety.

BACKGROUND

Hydrogen is one of the most promising and environmentally benign energy sources, since it can be converted into transportation fuel, electricity, and other energy forms with little pollution and high efficiency. However, the two objectives of reduced carbon emissions and enhanced use of hydrogen as a fuel are in direct conflict since the most commercially viable method for hydrogen production is from natural gas via steam methane reforming (SMR), which produces large amounts of carbon dioxide through the following reaction:

$$CH_4 + 2H_2O \rightarrow 4H_2 + CO_2$$

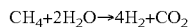

Over 200 billion cubic feet per year of natural gas at remote U.S production sites is rejected via flaring, mainly due to the limitations in pipeline transportation capacities and/or fluctuations in the well production rate. This represents a significant waste of resources. Process intensified modular units show promise in converting convert flared gas to value-added solid carbon and hydrogen, with modular equipment can be deployed and transported between remote locations. However, optimizing processes to produce both hydrogen and valuable carbon co-products remains a challenge.

The issue of "stranded gas" presents an additional problem. In U.S. and the rest of the world, numerous stranded gas resources (e.g., flare gas, refinery off gas, shale gas, and coal-bed methane) are not utilized because it is too expensive to build pipelines. Converting these "no-value gases" to solid carbon and hydrogen, and then to the electricity grid via fuel cell, should result in economic and environmental benefits.

Thermal decomposition of methane may require temperatures of up to 800 or 900° C. or higher, and often produces low value byproducts including low quality carbon black; such processes frequently produce non-crystalline carbon. Some heterogeneous catalytic processes are capable of generating CNTs; however, separation of the CNTs from the catalyst remains challenging.

Developing highly efficient catalysts and the regeneration of spent catalyst are major challenges in terms of producing solid crystalline carbon and hydrogen using the methane thermal catalytic decomposition processes. Catalytic efficiency must account for not only the specific activity of a catalyst, but also its resistance to coking, given the large amount of carbon accumulation that tends to occur and which is closely related to the lifetime of the catalyst. Different physicochemical processes may underlie catalytic activation and the nucleation of carbon nanotubes and nanofibers (CNTs/CNFs). The process generally proceeds by arranging carbon atoms on the surface of the catalyst nanoparticles, leading to CNT/CNF formation with either tip or base growth. A major challenge is to identify which phase is the catalytically active phase and which pathway leads to the most active carbon crystallization.

A further challenge in direct conversion of methane to hydrogen without using oxidants ($O_2$ and $H_2O$) is energy efficiency. New energy-efficient methods for hydrogen production and extraction must be realized on both centralized and distributed geographic scales. From an economic perspective, the process must yield high-value byproducts that can offset capital and feedstock costs from the conversion.

Application of microwave energy has been proposed as a way to provide a high degree of molecular dissociation to isolate hydrogen from the methane molecule. Typically, dielectric containment is necessary to contain microwave plasma and prevent arc-discharge against metal waveguide structures or propagating along the waveguide toward the microwave energy source. When applied to carbonaceous gases such as methane, plasma deposits carbon on the exposed dielectric surfaces. This acts as a microwave absorber and alters or disrupts process thermodynamics or kinetics and reduces structural integrity of the containment vessel. Reducing the carbon concentration in the feed stream by dilution with inert gases or pressure reduction can avoid carbon contamination. However, this also drastically reduces throughput and precludes process scale-up and overall economic viability. Additionally, separating solid carbon can be difficult. Most processes have high energy requirements (e.g. either high temperature operation or large electrical voltage and/or current).

Despite advances in hydrocarbon conversion research, there is still a scarcity of methods that produce sufficient levels of high-value byproducts, including hydrogen and solid carbon products, that offset capital and feedstock costs. Ideally, any such method would be scalable as well as energy-efficient and would include a means for separating solid carbon products. Further, the method would not produce carbon dioxide emissions. These needs and other needs are satisfied by the present disclosure.

SUMMARY

In accordance with the purpose(s) of the present disclosure, as embodied and broadly described herein, the disclosure, in one aspect, relates to $CO_2$-free and/or low-$CO_2$ methods of co-producing hydrogen and solid forms of carbon via methane decomposition using microwave radiation. The methods are efficient, self-sustaining, and environmentally benign. In a further aspect, the disclosure relates to recyclable and recoverable catalysts useful for enhancing the disclosed methods, wherein the catalysts are supported by solid forms of carbon. Methods for recycling the catalysts are also disclosed.

Disclosed herein are methods for producing hydrogen from at least one hydrocarbon gas, the method comprising: (a) applying microwave radiation to the hydrocarbon gas in the presence of a catalyst comprising metal atoms, wherein the microwave radiation causes the methane to decompose into hydrogen and at least one solid carbon product; (b) collecting the hydrogen; (c) contacting the catalyst and the at least one solid carbon product with an acid composition, wherein the acid composition causes the metal atoms to separate from the at least one solid carbon product; (d) removing the metal atoms from the acid composition; and (e) removing the at least one solid carbon product from the acid composition.

Also disclosed herein are methods for producing hydrogen from at least one hydrocarbon gas, the method comprising: (a) applying microwave radiation to the hydrocarbon gas in the presence of a catalyst comprising metal atoms, wherein the microwave radiation causes the methane to decompose into hydrogen and at least one solid carbon product; (b) collecting the hydrogen; (c) contacting the catalyst and the at least one solid carbon product with an acid composition, wherein the acid composition causes the metal atoms to separate from the at least one solid carbon product; (d) removing the metal atoms from the acid composition; and (e) removing the at least one solid carbon product from the acid composition; wherein the hydrocarbon gas comprises methane, ethane, propane, butane, or a combination thereof; and wherein the catalyst comprises Ni, Co, Mo, Pt, Pd, Cu, Sn, Mn. or a combination thereof.

Also disclosed herein are methods for making an aerogel-supported catalyst useful for microwave-assisted conversion of methane, the method comprising: (a) admixing a catalyst precursor compound and an aerogel precursor compound to create a first mixture; (b) adding a first solvent to the first mixture to create a second mixture; (c) agitating the second mixture for a first time period; (d) heating the second mixture at a first temperature for a second time period; (e) cooling the second mixture to a second temperature; (f) adding a gelation agent to the second mixture to form a third mixture; (g) incubating the third mixture at a third temperature for a third time period; (h) washing the third mixture with a second solvent; (i) soaking the third mixture with a third solvent for a fourth time period; and (j) vacuum drying the third mixture for a fifth time period.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 4A shows a representative synthesis process for preparation of disclosed Ni/Al$_2$O$_3$ aerogel catalyst using a modified sol-gel method. FIG. 4B shows a representative synthesis process for preparation of disclosed Co/Al$_2$O$_3$ aerogel catalyst using a modified sol-gel method.

FIGS. 5A-5F each show a TEM image of carbon nanotubes produced using a Ni/Al$_2$O$_3$ aerogel catalyst.

FIG. 15A shows the effect of flow rate on methane conversion as a function of flow rate for a disclosed method using microwave heating. FIG. 15B shows the effect of flow rate on methane conversion as a function of flow rate for using conventional heating.

Figure 1A:
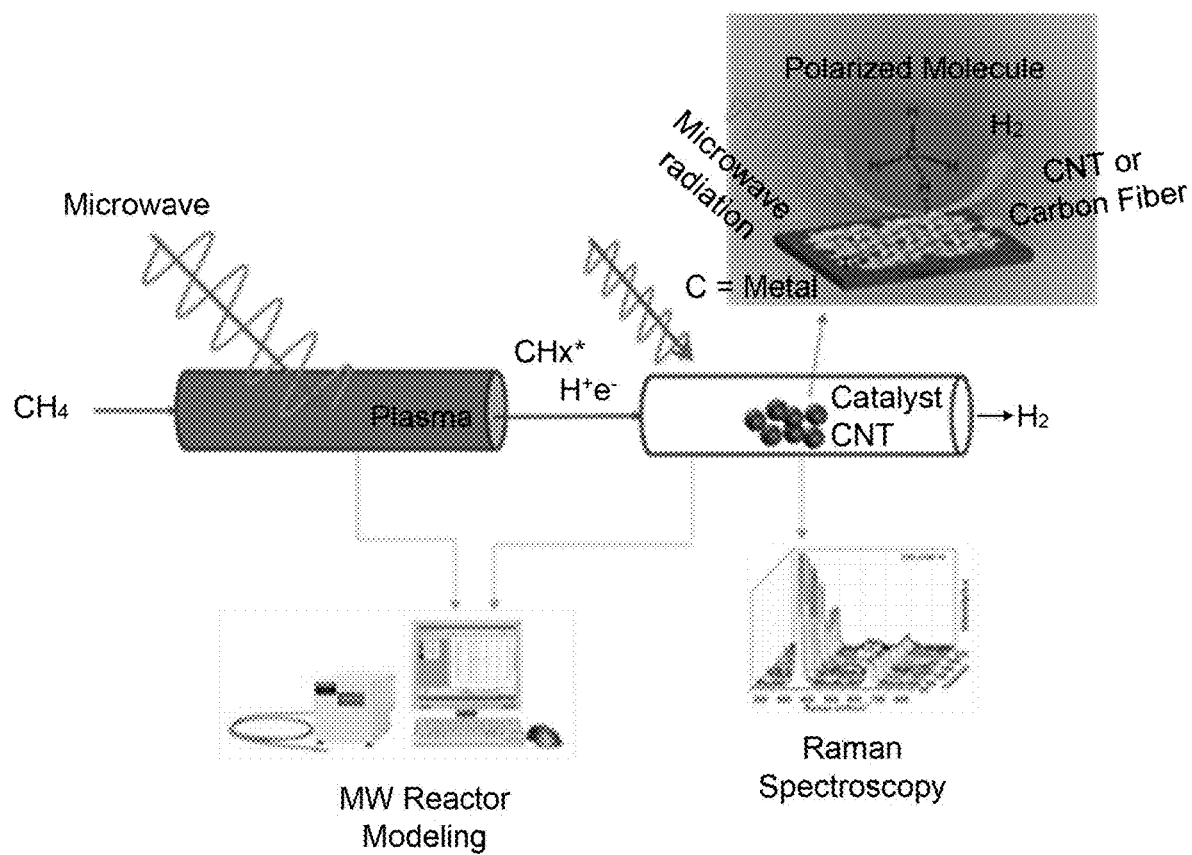
FIG. 1A shows a schematic of a two-stage microwave-induced plasma reactor for co-production of hydrogen and carbon nanotubes (CNTs) and carbon nanofibers (CNFs).

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of".

As used in the specification and the appended claims, the singular forms "a," "an" and "the" include plural referents unless the context clearly dictates otherwise. Thus, for example, reference to "a catalyst" or "a metal" includes, but is not limited to, combinations of two or more such catalysts or metals, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of a catalyst refers to an amount that is sufficient to achieve the desired improvement in the property modulated by the formulation component, e.g. achieving the desired level of hydrocarbon conversion over time. The specific level in terms of wt % in a composition required as an effective amount will depend upon a variety of factors including the amount and type of metal used as catalyst, amount and type of support (if any), number of reaction cycles, and recycling/recovery strategy for the catalyst.

As used herein, the terms "optional" or "optionally" means that the subsequently described event or circumstance can or cannot occur, and that the description includes instances where said event or circumstance occurs and instances where it does not.

"Steam methane reforming" as used herein is a process for the production of hydrogen from natural gas. In steam methane reforming, methane is heated with steam, typically in the presence of a catalyst, to produce a mixture of $CO_x$ species and hydrogen. CO and $CO_2$ produced may be reacted further in separate processes. In one aspect, the methods and processes disclosed herein are alternatives to steam methane reforming that do not produce $CO_x$ species.

A "fossil fuel" as used herein is a fuel formed by natural processes in the geological past such as, for example, coal, oil, or natural gas. In one aspect, the methane reformed by the processes disclosed herein is a fossil fuel. In an alternative aspect, methane from non-fossil fuel sources such as, for example, food waste or green waste, can also be a raw material for the processes disclosed herein.

"Carbon nanomaterials" are carbon-based materials having at least one dimension on the nanometer scale in size (i.e., from 1 to 1000 nm). Carbon nanomaterials can include, but are not limited to, nanoparticles, fullerenes, carbon filaments, single- and multi-walled carbon nanotubes (CNTs), carbon nanofibers (CNFs), and various graphene-based materials.

As used herein, "carbon filaments" include materials such as "carbon nanotubes" and "carbon nanofibers." Carbon filaments are graphite-based and typically have diameters from 0.4 to 500 nm, with lengths in the micrometer-to-millimeter scale range. Carbon nanotubes (CNT) can have single walls or can be multiwalled. CNTs have typically been prepared in the past using laser ablation, arc discharge, and/or chemical vapor deposition methods. In a further aspect, known methods for producing CNTs have drawbacks such as, for example, a requirement for high temperatures (1200-3000° C.) or a requirement to be produced in a vacuum or low pressure process. In an alternative aspect, non-catalytic decomposition of methane at temperatures from about 1000-1100° C. is known to produce amorphous carbon rather than CNTs or other carbon filaments. In one aspect, CNFs may consist of several different forms or layers of carbon. In some aspects, CNFs have properties similar to CNTs but lower tensile strength. In one aspect, CNFs are not hollow, while CNTs are hollow. In one aspect, CNTs and CNFs are used herein as supports for catalysts used in the processes disclosed herein. In another aspect, CNTs and CNFs are also products of the processes disclosed herein. In one aspect, CNTs and/or CNFs have potential applications in sensors including those useful in biomedical applications, electronic devices, lithium-ion batteries, hydrogen storage cells, protection from electrostatic discharge, structural reinforcement in construction and building projects, thin films, increasing the tensile strength of materials, textiles, coatings and films, solar cells, and numerous other related applications.

As used herein, "amorphous carbon" is carbon lacking a crystalline structure. Amorphous carbon is free and usually reactive, although it can be stabilized. In one aspect, the methods and processes disclosed herein can be fine-tuned to favor the production of CNTs and/or CNFs over amorphous carbon. In one aspect, non-catalytic decomposition of methane at high temperatures may produce some amount of amorphous carbon.

As used herein, "tip growth" refers to a mechanism for growth of CNTs where methane decomposes on the top surface of the metal catalyst, carbon diffuses downwards, and CNT precipitates, pushing the catalyst off the substrate. "Base growth," meanwhile, refers to a mechanism for growth of CNTs where CNT formation does not push the catalyst up and CNT grows out of the metal at the point farthest from the substrate. In one aspect, the CNT formed via the methods disclosed herein grow via a base growth mechanism. In another aspect, the CNT formed via the methods disclosed herein grow via a tip growth mechanism.

"$CO_x$-free" and "$CO_2$" free refer to processes and methods that do not produce measurable amounts of carbon dioxide, carbon monoxide, or related compounds as byproducts. In one aspects, the processes and methods disclosed herein are $CO_N$-free, $CO_2$-free, or both. In a further aspect, $CO_N$-free and $CO_2$-free processes are environmentally-sound as they do not release excess greenhouse gases into the atmosphere.

A "spent" or "deactivated" catalyst is a catalyst that can no longer catalyze a desired reaction. Catalysts may become spent or deactivated by a variety of means including poisoning (strong absorption of species at catalytic sites), fouling (physical deposition of material on the catalyst surface), mechanical stresses such as abrasion or crushing, and the like. A spent or deactivated catalyst can be regenerated but this is often an expensive, multistep process requiring the operation of complex equipment. Spent catalysts that cannot be or will not be regenerated typically contain heavy metals and must be discarded as hazardous waste. In one aspect, provided herein are facile methods for regenerating the catalysts used in the processes disclosed here, thereby avoiding the costly and environmentally hazardous problem of processing spent catalysts.

A "monometallic" catalyst is a catalyst that includes ions or atoms of one metal only. A "bimetallic" catalyst includes ions or atoms of two metals in any proportion relative to one another. In one aspect, the catalysts disclosed herein are monometallic or bimetallic. In another aspect, additional catalysts incorporating combinations of three, four, or more metals.

In some aspects, Raman spectroscopy can be used to evaluate the compositions disclosed herein after 1, 2, 3 4, 5, or more cycles of use. In some aspects, the "ID/IG" ratio can be used as a basis for estimating amount of structured versus unstructured carbon in a sample. In one aspect, the D band is reflective of disordered structure and is located between about 1300 and about 1400 cm$^{-1}$ and the G band is reflective of content of sp$^2$ hybridized carbon (i.e., ordered) and is located between about 1500 and about 1600 cm$^{-1}$, although these values can vary slightly based on particular aspects of the samples being analyzed. ID/IG ratio is most helpful when comparing similar samples such as, for example, catalyst/CNT compositions after one or more use cycles as disclosed herein. A relatively higher ID/IG ratio (i.e., comparison of relative peak areas) indicates a larger proportion of disordered carbon is present in a sample, while a relatively lower ID/IG ratio indicates a larger proportion of structured or sp$^2$ hybridized carbon is present. An unchanged ID/IG between different treatments indicates the proportions of structured and unstructured carbon are essentially unchanged between treatments.

As used herein, the Brunauer-Emmet-Teller method ("BET method") is typically used to determine surface area of a solid such as a catalyst in a manner that incorporates coverage of multiple layers.

As used herein, "thermogravimetric analysis" or "TGA" is a technique in which sample mass is measured over time as temperature is changed. TGA can be useful in the disclosed applications for determining crystallinity of the carbon materials produced.

As used herein, "h" is an abbreviation that means "hours".

Unless otherwise specified, temperatures referred to herein are based on atmospheric pressure (i.e. one atmosphere).

Direct Conversion of Hydrocarbon Gases to Hydrogen and Crystalline Carbon

Figure 2:
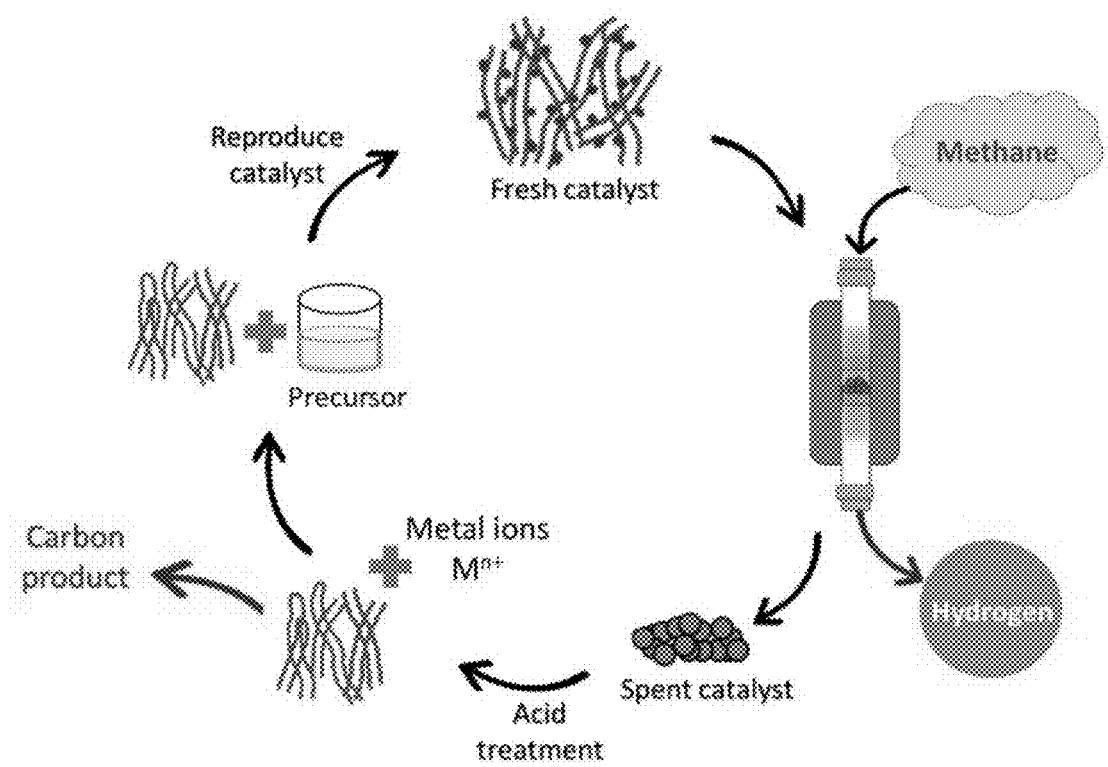
FIG. 2 shows one aspect of the process disclosed herein. Methane is fed into a reactor containing a catalyst, producing hydrogen as well as a mixture of spent catalyst and carbon products. Acid treatment separates the metal ions of the catalyst from the carbon product and the catalyst can then be reproduced and reused in another round of the reaction.

In one aspect, disclosed herein is a method for directly converting a hydrocarbon gas to hydrogen and crystalline carbon including, but not limited to, carbon nanotubes (CNT) and carbon nanofibers (CNF) (see FIG. 2). In another aspect, the hydrocarbon gas can be methane, ethane, propane, butane, or a combination thereof. In a further aspect, when the hydrocarbon gas is methane, the reaction proceeds according to the following general scheme:

$$CH_4 \rightarrow C_{(CNT,CNF)} + 2H_2$$

Without wishing to be bound by theory, the disclosed methods make use of fundamental phenomena in microwave catalytic reactions, selective bond activation, and the interface between reactant and catalyst during microwave irradiation. In one aspect, microwave irradiation can enable selective bond activation. In another aspect, integration of a microwave reactor with catalysts sensitive to electromagnetic energy can significantly increase the selectivity and yields of desired products. In a further aspect, the disclosed method integrates microwave plasma and catalytic methane decomposition.

In one aspect, microwave irradiation decouples methane activation from the conventional catalytic surface decomposition reaction:

$$CH_4 \rightarrow CH_3^* + H^+ + e^-$$

In a further aspect, as a result of this decoupling, in the second stage, the plasma species react on a catalyst surface to form CNT and hydrogen under less severe conditions than previously required (i.e., 600-700° C., ambient pressure):

$$CH_3^* + catalyst \rightarrow CNT + 1.5H_2$$

In one aspect, conventional methane decomposition overheats metal sites on the catalyst, causing significant chemical and/or microstructural changes to the catalyst as well as lower quality carbon formation. In a further aspect, the disclosed method reduces the energy required to break the carbon-hydrogen bond.

In a further aspect, the method disclosed herein results in a higher net energy gain than conventional methane reforming techniques. Without wishing to be bound by theory, the method delivers microwave energy to catalyst sites. In a further aspect, this is more efficient than conventional conductive or convective heating methods. An example net energy gain calculation comparing the disclosed method and conventional SMR is provided in Table 1:

TABLE 1

| Net Energy Gain for the Disclosed Process versus Conventional SMR | | |
|---|---|---|
| Reaction | $CH_4 \rightarrow CNT/CNF + 2H_2$ | $CH_4 + 2H_2O \rightarrow 4H_2 + CO_2$ |
| Heat Required for Reaction | 37 kJ/mol H$_2$ | 165 kJ/mol H$_2$ |
| Microwave Energy Input | 5 kJ/mol H$_2$ | N/A |
| Total Process Utility Energy Input | 42 kJ/mol H$_2$ | 165 kJ/mol H$_2$ |
| Output | 285 kJ/mol H$_2$* | 285 kJ/mol H$_2$ |
| Net Energy Gain | 243 kJ/mol H$_2$ | 120 kJ/mol H$_2$ |

*Does not include energy from CNT.

Method for Producing Hydrogen from Hydrocarbon Gases

Disclosed herein are methods for producing hydrogen from at least one hydrocarbon gas, the method comprising: (a) applying microwave radiation to the hydrocarbon gas in the presence of a catalyst comprising metal atoms, wherein the microwave radiation causes the methane to decompose into hydrogen and at least one solid carbon product; (b) collecting the hydrogen; (c) contacting the catalyst and the at least one solid carbon product with an acid composition, wherein the acid composition causes the metal atoms to separate from the at least one solid carbon product; (d) removing the metal atoms from the acid composition; and (e) removing the at least one solid carbon product from the acid composition.

Also disclosed herein are methods for producing hydrogen from at least one hydrocarbon gas, the method comprising: (a) applying microwave radiation to the hydrocarbon gas in the presence of a catalyst comprising metal atoms, wherein the microwave radiation causes the methane to decompose into hydrogen and at least one solid carbon product; (b) collecting the hydrogen; (c) contacting the catalyst and the at least one solid carbon product with an acid composition, wherein the acid composition causes the metal atoms to separate from the at least one solid carbon product; (d) removing the metal atoms from the acid composition; and (e) removing the at least one solid carbon product from the acid composition; wherein the hydrocarbon gas comprises methane, ethane, propane, butane, or a combination thereof; and wherein the catalyst comprises Ni, Co, Mo, Pt, Pd, Cu, Sn, Mn. or a combination thereof.

In another aspect, the solid carbon product can include nanoparticles, fullerenes, carbon filaments, single-walled carbon nanotubes (SWCNT), multi-walled carbon nanotubes (MWCNT), carbon nanofibers (CNF), or a combination thereof. In another aspect, the solid carbon product is SWCNT, MWCNT, and/or CNF. In a further aspect, the SWCNT, MWCNT, and/or CNF can have an outer diameter from about 10 to about 500 nm, or from about 15 to about 300 nm, or of about 10, 25, 50, 75, 100, 125, 150, 175, 200, 225, 250, 275, 300, 325, 350, 375, 400, 425, 450, 475, or about 500 nm, or a combination of any of the foregoing values, or a range encompassing any of the foregoing values. In another aspect, the SWCNT, MWCNT, and/or CNF can have a length from about 20 nm to about 50 μm, or from about 20 nm to about 50 μm, or from about 50 nm to about 25 μm, or of about 20, 40, 50, 60, 80, 100, 250, 500, or 750 nm or about 1, 2, 5, 10, 15, 20, 25, 30, 35, 40, 45, or about 50 μm, or a combination of any of the foregoing values, or a range encompassing any of the foregoing values.

In some aspects, the method further includes step (f): using a portion of the at least one solid carbon product as a supporting solid carbon product to restart the method beginning at step (a). In another aspect, about 5 to about 90 wt % of the at least one solid carbon product is used to restart the method, or about 10 to about 50 wt % of the at least one solid carbon product, or about 5, 10, 15, 20, 25, 30, 35, 40, 45, 50, 55, 60, 65, 70, 75, 80, 85, or about 90 wt % of the solid carbon product is used, or a combination of any of the foregoing values, or a range encompassing any of the foregoing values.

In still another aspect, the acid composition can include nitric acid. In another aspect, the nitric acid is from about 0.5 to about 12 M, or is about 3 M, or is about 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, or about 12 M, or a combination of any of the foregoing values, or a range encompassing any of the foregoing values. In some aspects, step (c) is carried out for about 3-5 h at from about 110 to about 130° C., or for about 4 h at about 120° C. In still another aspect, the solid carbon product and the catalyst can be contacted with a second acid composition. In another aspect, the second acid composition can be nitric acid. In a further aspect, the second acid composition can be concentrated nitric acid and the contact with this second acid composition is for about 12 hours at from about 130 to about 150° C., or at about 140° C.

In any of these aspects, the method can be repeated at least 1, 2, 3, or 4 times without a degradation in performance.

In any of these aspects, the method can be conducted in an inert atmosphere. In a further aspect, the inert atmosphere can include nitrogen, argon, or a combination thereof. In one aspect, the reaction gas hourly space velocity can be from about 5000 to about 50,000 h$^{-1}$, or can be about 5000, 6000, 7000, 8000, 9000, 10,000, 20,000, 30,000, 40,000 or about 50,000 h$^{-1}$, or can be about 10,000 h$^{-1}$. In another aspect, the method can be carried out for from about 5 to about 800 min for each cycle, or at about 5, 10, 15, 20, 25, 50, 75, 100, 125, 150, 175, 200, 225, 250, 275, 300, 350, 400, 450, 500, 550, 600, 650, 700, 750, or about 800 min, or a combination of any of the foregoing values, or a range encompassing any of the foregoing values.

In any of these aspects, at least 5, 10, 20, 30, 40, or at least 50% or greater of the hydrocarbon gas is converted to hydrogen and solid carbon products.

Also disclosed herein are composition including hydrogen and at least one solid carbon product, produced by the methods disclosed herein.

Uses for Crystalline Carbon

In one aspect, the crystalline carbon (i.e., CNTs and CNFs) generated from the process disclosed herein can be used as intermediates to make carbon fibers, carbon composites, and electrodes useful for electric arc steel production. In another aspect, CNT and CNF may be useful for the production of integrated circuits, hydrogen storage devices, lithium batteries, solar photovoltaic cells, fuel cells, drug delivery, and other applications. In a further aspect, the processes disclosed herein can produce both single-walled and multi-walled CNTs.

Utilization of Stranded Gas Resources

In one aspect, the methods disclosed herein are particularly useful for the direct conversion of stranded gas resources such as, for example, flare gas, to carbon nanomaterials and hydrogen. In another aspect, the method can be performed using modular components that are deployable to flare gas locations. In a further aspect, the modular components can operate at varying feed rates and compositions as required by local conditions.

In another aspect, the disclosed method can provide a clean and efficient means of natural gas utilization. In one aspect, converting natural gas to hydrogen while simultaneously producing high-value carbon materials represents a cost-effective means of decarbonizing hydrogen production by sequestering the carbon into construction or other useful materials. In a further aspect, supporting the use of fuel cells in electric vehicles and distributed power generation markets by providing low-carbon hydrogen could substantially reduce greenhouse gases, NOR, and particulate matter emissions.

Catalysts

In one aspect, the catalytic materials useful herein have dielectric properties that allow microwave absorption, especially at higher temperatures. In a further aspect, the catalysts can be designed to interact with microwaves through other mechanisms. In one aspect, a metal dopant such as, for example, iron, can be added to catalytic sites for magnetic coupling. In one aspect, a ferromagnetic species can couple with the magnetic component of the microwave field, adding energy to the reaction. In a further aspect, coupling of the microwave field with polar intermediate species on the surface of the catalyst can increase the amount of energy available for the reaction.

In one aspect, the catalyst can be supported by an aerogel. In a further aspect, the aerogel can be an $Al_2O_3$ aerogel. In one aspect, when the catalyst is an aerogel, the catalyst can be a Ni—Pd catalyst, wherein the ratio of Ni:Pd:support is from about 8:1:91 to about 12:1:87, or is about 8:1:91, 9:1:90, 10:1:89, 11:1:88, or about 12:1:87, or a combination of any of the foregoing values, or a range encompassing any of the foregoing values. In one aspect, the ratio of Ni:Pd:support is about 10:1:89.

In another aspect, the catalyst can be supported by crystalline forms of carbon generated by the processes disclosed herein, SiC, $SiO_2$, $Al_2O_3$, $TiO_2$, $ZrO_2$, or a combination thereof. In one aspect, when the support is a crystalline form of carbon, the support can be selected from nanoparticles, fullerenes, carbon filaments, single-walled carbon nanotubes, multi-walled carbon nanotubes, carbon nanofibers, or a combination thereof.

In some aspects, the catalyst support can be an aerogel.

In some aspects, the catalysts, whether supported or unsupported, can be bimetallic. In one aspect, the bimetallic catalyst can be a Ni—Pd catalyst. In another aspect, the Ni—Pd catalyst can be doped by an alkali metal, an alkaline earth metal, or a transition metal including, but not limited to, Fe, Li, Na, K, Cs, Mg, Ca, Ba, or a combination thereof. In one aspect, the addition of an alkali metal, alkaline earth metal, or transition metal can promote catalyst structure, modify active metal dispersion, and/or promote hydrogen spillover. In other aspects, the catalysts can be trimetallic.

In one aspect, certain catalysts are expected to display higher levels of hydrocarbon conversion under microwave heating versus conventional thermal heating. In a further aspect, these catalysts include, but are not limited to aerogel catalysts including monometallic or bimetallic Ni, Co, Mo, Pt, Pd, Cu, Sn, Mn, and combinations thereof; Ni—Pd, Ni—Cu, and/or Ni—Sn either unsupported or on CNT or CNF support, and combinations thereof; and Ni—Pd, Ni—Cu, and/or Ni—Sn on SiC support, and combinations thereof.

In further aspects, the catalyst support can be a perovskite. The term "perovskite" as used herein is used to refer to a perovskite-type oxide, for example a perovskite-type oxide having the general formula $ABO_3$, where A and B are cations and cation A is larger than cation B. The general formula $ABO_3$ described herein encompasses the formula $AB_xO_3$, where x ranges from about 0.9 to about 1.1, for example about 0.95 to about 1.05, or about 0.99 to about 1.01. In certain embodiments x is about 1. The term "perovskite support" refers to a perovskite for supporting a catalytic component as disclosed herein, for example, the perovskite support may not be a catalytic component itself but supports a catalytic component. The perovskite support may be provided to support a catalytic component for catalyzing a reaction to obtain a desired reaction product.

Aerogel-Supported Catalysts and Method of Making

Disclosed herein are methods for making an aerogel-supported catalyst useful for microwave-assisted conversion of methane, the method comprising: (a) admixing a catalyst precursor compound and an aerogel precursor compound to create a first mixture; (b) adding a first solvent to the first mixture to create a second mixture; (c) agitating the second mixture for a first time period; (d) heating the second mixture at a first temperature for a second time period; (e) cooling the second mixture to a second temperature; (f) adding a gelation agent to the second mixture to form a third mixture; (g) incubating the third mixture at a third temperature for a third time period; (h) washing the third mixture with a second solvent; (i) soaking the third mixture with a third solvent for a fourth time period; and (j) vacuum drying the third mixture for a fifth time period.

In another aspect, the catalyst precursor compound can be $Ni(NO_3)_2.6H_2O$, $Co(NO_3)_2.6H_2O$, $Fe(NO_3)_3.6H_2O$, $Pd(NO_3)_2.6H_2O$, or any combination thereof. In still another aspect, the aerogel precursor compound can be $AlCl_3.6H_2O$.

In one aspect, the first solvent can be water, ethanol, or a combination thereof, and the first time period is about from about 30 to about 45 min, or can be about 30 min. In another aspect, the first temperature is from about 75 to about 85° C., or can be about 80° C. In one aspect, the second time period is from about 1 h to about 1.5 h, or can be about 1 h. In another aspect, the second temperature is from about −5 to about 0° C., or can be about 0° C. In one aspect, the gelation agent can be propylene oxide, ethylene glycol, hexylene glycol, or a combination thereof. In still another aspect, the third temperature can be from about 20 to about 30° C., or can be about 20° C. In one aspect, the third time period is from about 30 to about 50 min, or can be about 35 min. In one aspect, the second solvent can be water and the third solvent can be ethanol. In another aspect, the fourth time period is from about 11 to about 13 h, or can be about 12 h and the fifth time period is from about 8 to about 10 h, or can be about 9 h.

In one aspect, when the aerogel-supported catalyst is $Ni/Al_2O_3$, the method further includes step (h1): reducing the catalyst at a fourth temperature for a sixth time period. In one aspect, the fourth temperature is from about 465 to about 475° C. or is about 470° C. and the sixth time period is from about 2.5 to about 3 h, or can be about 2.5 h.

In another aspect, when the aerogel-supported catalyst is $Co/Al_2O_3$, the method further includes step (h2): calcining the catalyst at a fifth temperature for a seventh time period. In one aspect, the fifth temperature is from about 495 to about 505° C. or can be about 500° C. and the seventh time period is from about 3 to about 3.5 h or can be about 3 h. In still another aspect, the method when the catalyst is $Co/Al_2O_3$ further includes step (i): reducing the catalyst at a sixth temperature for an eighth time period. In some aspects, the sixth temperature is from about 545 to about 555° C. or can be about 550° C. and the eighth time period is from about 2.5 to about 3 h, or can be about 2.5 h.

Solid Carbon Supported Catalysts
Ratio of Metals in Catalyst

In some aspects, different metal ratios (by weight) can be used in the supported and/or unsupported catalysts disclosed herein. In a further aspect, altering the ratio of metals (such as, for example, Ni and Pd) can alter the catalytic performance of the system. In one aspect, pure Ni can be used as catalyst. In another aspect, pure Pd can be used as catalyst. In still another aspect, a different metal can be used as catalyst. In one aspect, the ratio of Ni to Pd can be 20:1, 15:1, 10:1, 5:1, 1:1, or another ratio, or a combination of any of the foregoing values, or a range encompassing any of the foregoing values. In one aspect, the ratio of Ni to Pd is 10:1. In another aspect, the ratio of Ni to Pd is 5:1. Without wishing to be bound by theory, it is believed the metals in the solid solution of Ni and Pd have synergistic catalytic effects that are only achieved when a minimum concentration of Pd is present.

In one aspect, different catalyst metal compositions may have different average particle sizes that can be determined by examination with an electron microscope. In one aspect, for a Ni/CNT catalyst, round metal particles with an average diameter from about 50 to about 100 nm, or about 50, 60, 70, 80, 90, or about 100 nm are observed. In another aspect, for an unsupported Ni catalyst, large agglomerates with diameters of hundreds of nm (with some upwards of 500 nm) are observed. In another aspect, for a Pd/CNT catalyst, the average metal particle size is about 5 nm. In one aspect, with increased amounts of Ni versus Pd in unsupported catalysts, more agglomeration is observed. In one aspect, the same effects may not be observed for CNT-supported catalysts. Without wishing to be bound by theory, the presence of CNT or other supports may aid in distribution of the metal catalyst particles such that agglomeration does not occur. In any of the above aspects, catalyst particles with average diameters on the order of about 50 to about 100 nm that do not agglomerate may be the most effective at enabling and/or enhancing the disclosed processes. In any of the above aspects, agglomeration may be associated with sintering behavior (i.e., coalescence into a solid mass). In one aspect, catalysts that resist sintering may be particularly effective at enabling and/or enhancing the disclosed processes.

Catalyst Reproduction/Recycling

Commercially-available catalysts, especially those that are oxide-supported, are difficult to recover when dissolved in organic or inorganic solution. In one aspect, provided herein is a method for recycling and recovering the catalysts disclosed herein. In one aspect, although the catalysts disclosed herein exhibit excellent reproducibility in terms of hydrogen generation over time, they will eventually become spent or deactivated and will need to be regenerated or recycled. In another aspect, the method disclosed herein can be useful in regenerating or recycling the catalysts disclosed herein. In one aspect, spent catalysts can be refluxed with an acid such as, for example, nitric acid. In a further aspect, reflux can be carried out in one step or may require two steps, each with a different concentration of acid. In one aspect, the spent catalyst can be refluxed with nitric acid at a concentration of from 0.01 M to 15.7 M, or from about 0.5 M to 10 M, or from 0.5 M to 5 M, or the nitric acid concentration can be about 0.01, 0.05, 0.1, 0.5, 1, 1.5, 2, 2.5, 3, 3.5, 4, 4.5, 5, 5.5, 6, 6.6, 7, 7.5, 8, 8.5, 9, 9.5, 10, 10.5, 11, 11.5, 12, 12.5, 13, 13.5, 14, 14.5, 15, 15.5, or about 15.7 M, or a combination of any of the foregoing values, or a range encompassing any of the foregoing values. In another aspect, the spent catalyst can be refluxed at from about 25° C. to about 250° C., or from about 30° C. to about 140° C., or from about 40° C. to about 120° C., or can be refluxed at about 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, or about 250° C., or a combination of any of the foregoing values, or a range encompassing any of the foregoing values. In still another aspect, reflux can be conducted for from about 0.5 to about 36 hours, or from about 0.5 to about 24 hours, or from about 1 to about 18 hours, or for about 0.5, 1, 1.5, 2, 2.5, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, or about 36 hours, or a combination of any of the foregoing values, or a range encompassing any of the foregoing values. In one aspect, the spent catalyst can be refluxed with 3M $HNO_3$ at 120° C. for 4 h, followed by reflux with concentrated $HNO_3$ at 140° C. for 12 h. In some aspects, dilute nitric acid can be used for either of these reflux steps. In one aspect, the nitric acid can have a concentration from about 0.1 M to about 15.8 M, or is about 0.1, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, or about 15.8 M or a combination of any of the foregoing values, or a range encompassing any of the foregoing values. In one aspect, reflux is conducted with continuous magnetic stirring.

In another aspect, following reflux, solid carbon particles and nanostructures can be filtered and washed with a solvent such as, for example, deionized water. In one aspect, when the metals are dissolved in acid solutions, they re-form metal counter-ion precursors, wherein the counter-ions are sourced from the acids. Thus, further in this aspect, the following scheme for nickel in nitric acid is generalizable to other metals and acids with stoichiometries determined based on metal oxidation state and counter-ion charge:

$Ni + 4HNO_3 \rightarrow Ni(NO_3)_2 + 2NO_2 + 2H_2O$

In one aspect, the carbon particles can be dried at elevated temperature such as, for example, at 80° C. Following drying, in another aspect, a portion of the carbon particles can be used in the next catalytic cycle. In one aspect, from about 1 to about 99 wt % of the carbon particles can be used in the next catalytic cycle, or from about 5 to about 90 wt % of the carbon particles can be used in the next catalytic cycle, or from about 10 to about 50% of the carbon particles can be used in the next catalytic cycle, or about 1, 5, 10, 15, 20, 25, 30, 35, 40, 45, 50, 55, 60, 65, 70, 75, 80, 85, 90, 95, or about 99 wt % of the carbon particles can be used in the next catalytic cycle, or a combination of any of the foregoing values, or a range encompassing any of the foregoing values.

In some aspects, Raman spectroscopy can be used to evaluate the compositions disclosed herein after 1, 2, 3 4, 5, or more cycles of use. In some aspects, the "ID/IG" ratio can be used as a basis for estimating amount of structured versus unstructured carbon in a sample. In one aspect, the D band is reflective of disordered structure and is located between about 1300 and about 1400 $cm^{-1}$ land the G band is reflective of content of $sp^2$ hybridized carbon (i.e., ordered) and is located between about 1500 and about 1600 $cm^{-1}$, although these values can vary slightly based on particular aspects of the samples being analyzed. ID/IG ratio is most helpful when comparing similar samples such as, for example, catalyst/CNT compositions after one or more use cycles as disclosed herein. A relatively higher ID/IG ratio (i.e., comparison of relative peak areas) indicates a larger proportion of disordered carbon is present in a sample, while a relatively lower ID/IG ratio indicates a larger proportion of structured or $sp^2$ hybridized carbon is present. An unchanged ID/IG between different treatments indicates the proportions of structured and unstructured carbon are essentially unchanged between treatments.

Carbon Product

In one aspect, during the catalyst reproduction or recycling step described herein, a portion of the solid carbon from the reaction vessel is retained as a support for the next catalytic cycle. Further in this aspect, since nanostructured carbon is a product of the reactions disclosed herein, some amount of excess carbon will be available after catalyst recycling. Still further in this aspect, this excess carbon is already purified and dried due to processing in the catalyst recovery step and can be further characterized by any means known in the art including, but not limited to, electron microscopy to evaluate structure, width, and length, X-ray diffraction and/or Raman spectroscopy to assess crystallinity, thermogravimetric analysis to assess whether any amorphous carbon is present, and similar techniques.

In some aspects, the CNT and CNF that are produced are single-walled. In other aspects, multiwalled carbon nanotubes (MWCNT) may be produced. In one aspect, MWCNT have a diameter close to the particle size of Ni on CNT support. Without wishing to be bound by theory, a Ni/CNT catalyst may be particularly effective at forming MWCNT.

Carbon Nanomaterial Growth Mechanism

In one aspect, the second carbon product of the method disclosed herein is deposited on the first carbon product as an extension of the nanotube or nanofibril structure. In some aspects, carbon formed on the surface of CNT-supported catalyst can diffuse to the opposite side of the carbon support. In one aspect, without wishing to be bound by theory, carbon diffusion may be due to the temperature gradient created in the carbon support due to the exothermic decomposition of methane on the surface and the endothermic deposition of carbon on the surface opposite the catalytic site. In another aspect, also without wishing to be bound by theory, due to the lower surface energy of the basal planes of graphite compared to prismatic planes, carbon filaments tend to precipitate with the basal planes into a tubular structure.

Advantages of Microwave Heating over Conventional Heating

In one aspect, microwave heating is more energy efficient than conventional heating. In a further aspect, applied energy from microwave heating concentrates on catalyst sites (e.g., metal clusters) and is thus selective, with metal parts of the catalyst acting as "hot spots" while the support maintains a lower temperature. Further in this aspect, the methane decomposition reaction takes place in the areas directly adjacent to the hot spots. In an alternative aspect, conventional heating operates through a convective heat transfer process that is indiscriminate with respect to gas feed, reactor, and catalyst. In an alternative aspect, heat transfer is from an external furnace to the reactor wall, then to catalyst support before active sites are heated up, whereas the microwave reactor can deliver electromagnetic energy to active sites directly, thereby achieving an energy savings. In a further aspect, waste heat from catalyst regeneration can be used to preheat feedstock, reserving the need for microwave energy for C—H bond activation only.

In another aspect, microwave heating can be turned on or off, whereas conventional heating requires time to heat up or cool down. Without wishing to be bound by theory, in one aspect, the electric field of the microwave creates dipoles on the catalyst surface through a relaxation process that, in turn, facilitates the decomposition of methane. In an alternative aspect, conventional heating does not have this effect. In another aspect, microwave heating increases the pre-exponential factor in the Arrhenius equation model of methane decomposition, leading to a higher reaction rate and facilitating decomposition, whereas conventional heating does not have this effect.

In one aspect, the microwave radiation induces a temperature in the catalyst from about 400 to about 700° C., or from about 550 to about 600° C., or of about 400, 450, 500, 550, 600, 650, or about 700° C., or a combination of any of the foregoing values, or a range encompassing any of the foregoing values.

In still another aspect, the properties of the CNTs/CNFs produced, such as, for example, length, diameter, and wall thickness are sensitive to microwave power input and frequency and are thus more tunable under microwave heating than under conventional heating. In one aspect, longer CNTs can be produced under microwave conditions versus non-microwave conditions.

In one aspect, microwave heating avoids the problem of metal sintering using conventional heating. Further in this aspect, due to the decoupling of methane activation from catalyst surface reaction, the microwave-activated species can react on the catalyst surface to form CNTs and hydrogen under less severe conditions.

Advantages of Microwave Heating over Steam Methane Reforming

In one aspect, the disclosed method is more energy efficient, creates higher value byproducts, and reduces overall $CO_2$ emissions. Preliminary analysis is presented in Table 2:

TABLE 2

Carbon Balance and Energy Efficiency

| | Natural Gas (kg/kg $H_2$) | CNT (kg/kg $H_2$) | $CO_2$ Emission (kg/kg $H_2$) | Energy Efficiency |
|---|---|---|---|---|
| SMR | 4.18 | none | 11.5 | 63.2 |
| Disclosed Method | 4.05 | 1.8 | 4.5 | 67.9 |

Microwave Reactor and Process

In one aspect, the reactor disclosed herein can be a variable frequency microwave reactor system. In another aspect, one of the mechanisms by which the catalyst and reacting species can interact with the microwave field and provide energy to the reaction is through relaxation processes. In a further aspect, these relaxations include dipolar or Debye processes, which involve the coupling of the radiation with dipoles in the solid catalyst. In a further aspect, these dipoles can be defect sites (i.e., atomic vacancies) in the catalysts or dangling bonds on the surface of the catalyst. In a further aspect, dipoles on the catalyst surface can be reactants or products susceptible to selective bond activation effects which, in turn, can affect reaction rates.

In one aspect, the reactor can be a fluidized bed reactor. In another aspect, the reactor can have a cavity from about 915 MHz to about 20 GHz, or of about 915, 950, or 975 MHz, or 1, 2, 3, 4, 5, 6, 7, 8, 9, 10, 11, 12, 13, 14, 15, 16, 17, 18, 19, or about 20 GHz, or a combination of any of the foregoing values, or a range encompassing any of the foregoing values. In another aspect, the reactor can be operated in a system having a variable frequency from about 5.85 to about 8.25 GHz. In a further aspect, the reactor can be operated in a system having a variable frequency from about 5.85 to about 6.85 GHz. In one aspect, a cavity that is lower (i.e., 915 MHz) can allow for scaling of the reaction to high power (>50 kW) generators for industrial use. In any of the above aspects, the reactor cavity is designed for extending a uniform microwave field through the length of an inner quartz reactor tube. In one aspect, the microwave generator can be from about 200 W to about 10 MW, or at about 200, 400, 600, or 800 W, or about 1, 10, 15, 20, 25, 30, 35, 40, 45, 50, 55, 60, 65, 70, 75, 80, 85, 90, or 95 kW, or about 1, 2, 3, 4, 5, 6, 7, 8, 9, or 10 MW, or a combination of any of the foregoing values, or a range encompassing any of the foregoing values.

Figure 1B:
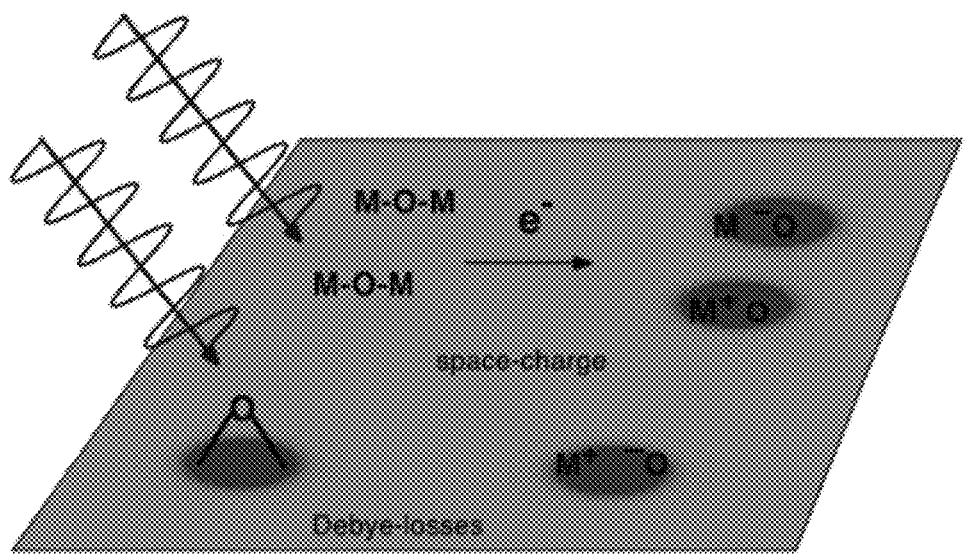
FIG. 1B shows a schematic of space-charge and Debye dielectric loss mechanisms for bond activation of reactant molecules.

In one aspect, the microwave reactor can be modular. In a further aspect, modular design allows adjustments of geometry to control gas flows and fluidization to accommodate changes in gas velocities and power inputs. In one aspect, when the microwave reactor has two stages, the first stage reactor can decouple methane activation from the conventional catalytic surface reaction. In another aspect, the second stage can be a variable frequency microwave catalytic reactor, which can incorporate dipolar and/or Debye processes as discussed herein. A schematic of a two-stage reactor can be seen in FIG. 1A. A schematic of space-charge and Debye dielectric loss mechanisms for microwaves interacting with a catalyst surface is shown in FIG. 1B.

In one aspect, introduction of a microwave catalytic plasma source can reduce the energy required to dissociate hydrogen from various hydrogen-containing compounds such as, for example, methane gas. In another aspect, a microwave plasma source is electrodeless but can still produce a high degree of ionization.

In one aspect, space velocity, metal loading on catalyst, temperature, pressure, microwave power, and microwave frequency are expected to affect the lengths, diameters, and wall thicknesses of any CNT and/or CNF produced by the disclosed reactions. In another aspect, the method disclosed herein is performed at from about 1 to about 20 atm, or at about 1, 2, 3, 4, 5, 6, 7, 8, 9, 10, 11, 12, 13, 14, 15, 16, 17, 18, 19, or about 20 atm, or a combination of any of the foregoing values, or a range encompassing any of the foregoing values.

Process Flow

In one aspect, the modular units disclosed herein can be deployed at flared gas sites, and resulting CNTs and CNFs can be transported by truck, railroad, or another means to a site for further processing. In a further aspect, the hydrogen gas produced by the process disclosed herein can be converted to electricity via fuel cell, or can be reacted with nitrogen or carbon dioxide to generate transportable liquid ammonia or liquid fuel.

Figure 13:
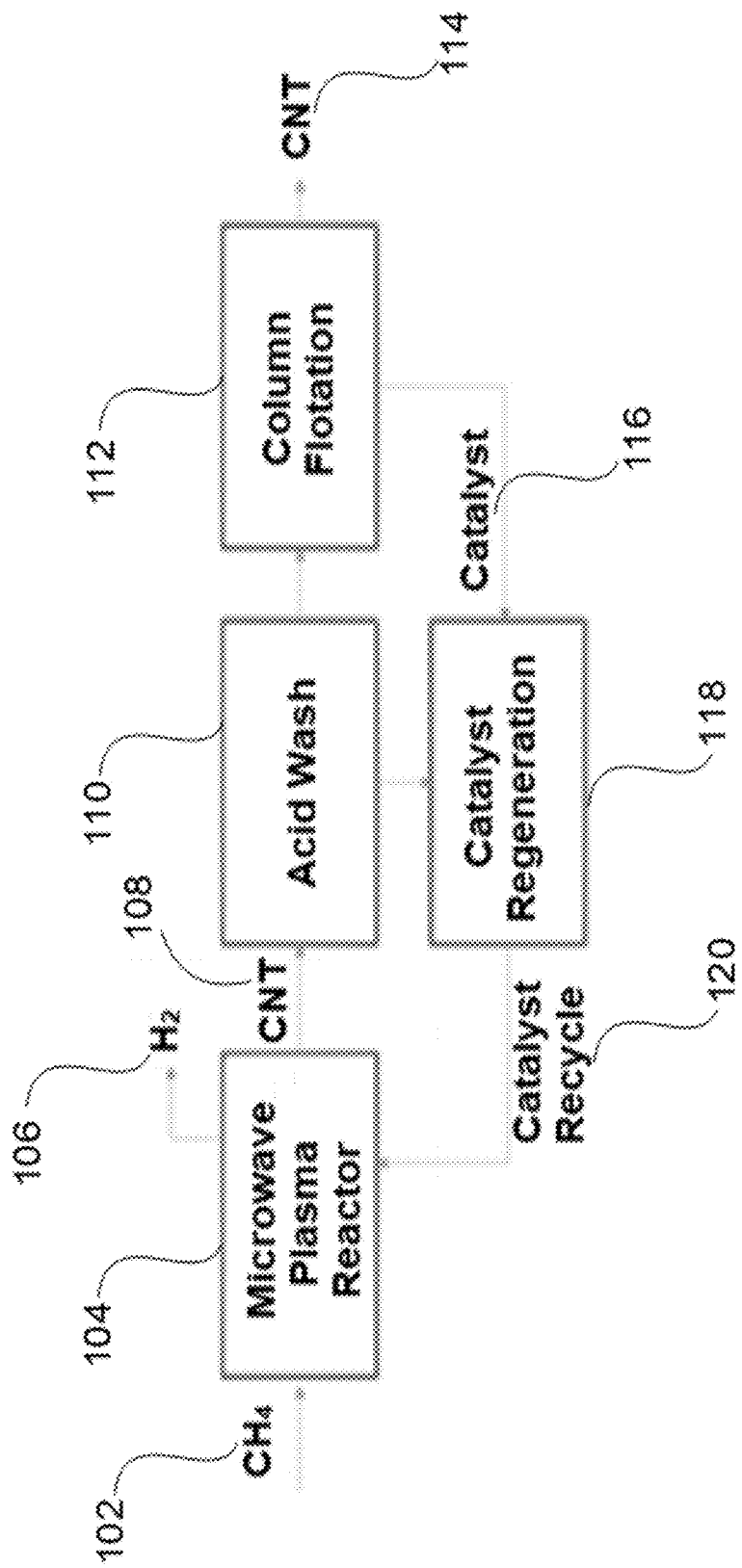
FIG. 13 shows a process flow diagram of a methane decomposition process.

FIG. 13 shows an exemplary process as disclosed herein. Methane stream 102 is fed into microwave plasma reactor 104 and produces hydrogen 106 during the course of the reaction, as well as carbon nanotubes 108. CNT 108 are washed with acid in acid wash unit 110, fed through flotation column 112, and some or all CNT 114 are extracted from the flotation column 112. Separately, catalyst 116 is removed from the flotation column 112, or transferred directly from acid wash unit 110, resulting in catalyst regeneration 118. A catalyst recycling 120 step has thus been completed, and the catalyst is ready to be placed into microwave plasma reactor 104 for another reaction round.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

REFERENCES

References are cited herein throughout using the format of reference number(s) enclosed by parentheses corresponding to one or more of the following numbered references. For example, citation of references numbers 1 and 2 immediately herein below would be indicated in the disclosure as (1, 2).

1. Abandes, J. C. et al., "On the climate change mitigation potential of CO2 to fuels," 2017, Energy and Environmental Sci., 10:2491-2499.
2. Ago, H., et al., J. Phys. Chem. B, 2004, 108, 18908-18915.
3. Akcil, A., et al., Waste Management, 2015, 45, 420-433.
4. Bai, X., et al., "Microwave Catalytic Reactor for Upgrading Stranded Shale Gas to Aromatics," Fuel, 243, 485-492, 2019.
5. Balesini, A. A., et al., Int. J. Miner. Metall. Mater., 2013, 20, 1029-1034.
6. Bromberg, L., et al., "Plasma catalytic reforming of methane" Int. J. Hydrogen Energy 24 (1999) 1131-7.
7. Czernichowski, A. "Glidarc assisted preparation of the synthesis gas from natural and waste hydrocarbon gases," Oil Gas Sci. Technol. Rev. IFP 56 (2001) 181-98.
8. Dagle, R. et al., U.S. Dept of Energy Report "R&D Opportunities for Development of Natural Gas Conversion Technologies for Co-Production of Hydrogen and Value-Added Solid Carbon Products," ANL-17/11|PNNL-26726 (2017), <https://www.pnnl.gov/main/publications/external/technical_reports/PNNL-26726.pdf> Accessed 4/30/2020, 73pp.
9. Das, R., "Carbon Nanotube Purification," 2017, DOI: 10.1007/978-3-319-58151-4_3, 55-73.
10. Deminsky, M., et al., "Plasma-assisted production of hydrogen from hydrocarbons", Pure Appl. Chem. 74 (2002) 413-8.
11. Gao, B., et al., "Catalytic Performance and Reproducibility of $Ni/Al_2O_3$ and $Co/Al_2O_3$ Mesoporous Aerogel Catalysts for Methane Decomposition," Industrial & Engineering Chemistry Research, 58 (2), 798-807, 2018.
12. Hongo, H., et al., Chem. Phys. Lett., 2002, 361, 349-354.
13. Hou, P.-X., et al., Carbon, 2008, 46, 2003-2025.
14. Hu, J., et al., Separation and Purification Technology, 2012, 95, 136-143.
15. Hunt, J., et al., "Microwave-Specific Enhancement of the Carbon-Carbon Dioxide (Boudouard) Reaction," J. Phys. Chem. C, 117(51), 2013, 26871-26880
16. Jung, Y. J., et al., J. Phys. Chem. B, 2003, 107, 6859-6864.
17. Kutteri, D. A., et al., "Methane Decomposition to Tip and Base Grown Carbon Nanotubes and COx free H2 over Mono and Bimetallic 3d Transition Metal Catalysts," Catalysis Science & Technology, 8, 858-869, 2018.
18. Li, W. Z., et al., Chem. Phys. Lett., 2003, 368, 299-306.
19. Microwave Chemical Co., Ltd., "Scaling Up of Microwave Reactor," http://mwcc.jp/en/service_technology/platform03.html Accessed 4/30/2020.
20. Muradov, N. Z., "CO2-free production of hydrogen by catalytic pyrolysis of hydrocarbon fuel," Energ. Fuel, 12 (1998) 41-48.
21. Parija, C., et al., Hydrometallurgy, 1998, 49, 255-261.
22. Petitpas, G., et al., "A comparative study of non-thermal plasma assisted reforming technologies", Int. J. Hydrogen Energy 32 (2007) 2848-67.
23. Petitpas, G., et al., "A comparative study of non-thermal plasma assisted reforming technologies", Int. J. Hydrogen Energy 32 (2007) 2848-67.
24. Pirard, S. L. et al., Front. Chem. Sci. Eng., 2017, 11, 280-289.
25. Rao, R., et al., ACS Nano, 2018, 12, 11756-11784.
26. Rzelewska-Piekut, M., et al., Separation and Purification Technology, 2019, 212, 791-801.
27. Sahu, K. K., et al., Journal of Environmental Management, 2013, 125, 68-73.
28. Salameh, S. et al, "Advances in scalable gas-phase manufacturing and processing of nanostructured solids: a review," Particuology, 2017, 30:15-39.
29. Shelimov, K. B., et al., Chemical Physics Letters, 1998, 282, 429-434.
30. Sobacchi, M., et al., "Experimental assessment of a combined plasma/catalytic system for hydrogen production via partial oxidation of hydrocarbon fuels" Int. J Hydrogen Energy 27 (2002) 635-42.
31. Tabulina, L. V., et al., Seriya Khimiya i Khimicheskaya Tekhnologiya, 2017, 60, 89-94.
32. Upham, D. C. et al., Science, 2017, 358:917-921.
33. Wang, I-W., et al., "Methane Pyrolysis for Carbon Nanotubes and COx-Free H2 over Transition-Metal Catalysts," Energy & Fuels, 2019, 33:197-205.
34. Ward, J. W., et al., Chem. Phys. Lett., 2003, 376, 717-725.

Aspects

The following listing of exemplary aspects supports and is supported by the disclosure provided herein.

Aspect 1. A method for producing hydrogen from at least one hydrocarbon gas, the method comprising: (a) applying microwave radiation to the hydrocarbon gas in the presence of a catalyst comprising metal atoms, wherein the microwave radiation causes the methane to decompose into hydrogen and at least one solid carbon product; (b) collecting the hydrogen; (c) contacting the catalyst and the at least one solid carbon product with an acid composition, wherein the acid composition causes the metal atoms to separate from the at least one solid carbon product; (d) removing the metal atoms from the acid composition; and (e) removing the at least one solid carbon product from the acid composition.

Aspect 2. The method of Aspect 1, wherein the hydrocarbon gas comprises methane, ethane, propane, butane, or a combination thereof.

Aspect 3. The method of Aspect 1 or Aspect 2, wherein the catalyst further comprises a support.

Aspect 4. The method of Aspect 3, wherein the support comprises a supporting solid carbon product, SiC, $SiO_2$, $TiO_2$, $ZrO_2$, an aerogel, a perovskite, such as SrTiNiO—Ni, or a combination thereof.

Aspect 5. The method of Aspect 4, wherein the aerogel comprises $Al_2O_3$.

Aspect 6. The method of Aspect 1, wherein the catalyst is unsupported.

Aspect 7. The method of any one of Aspect 1-Aspect 6, wherein the catalyst comprises Ni, Co, Mo, Pt, Pd, Cu, Sn, Mn. or a combination thereof.

Aspect 8. The method of Aspect 7, wherein the catalyst is monometallic.

Aspect 9. The method of Aspect 7, wherein the catalyst is bimetallic, trimetallic, or a combination thereof.

Aspect 10. The method of any one of Aspect 1-Aspect 9, wherein the catalyst further comprises a dopant.

Aspect 11. The method of Aspect 10, wherein the dopant comprises an alkali metal, an alkaline earth metal, a transition metal, or a combination thereof.

Aspect 12. The method of Aspect 11, wherein the alkali metal comprises Li, Na, K, Cs or a combination thereof.

Aspect 13. The method of Aspect 11, wherein the alkaline earth metal comprises Mg, Ca, Ba, or a combination thereof.

Aspect 14. The method of Aspect 11, wherein the transition metal comprises Fe.

Aspect 15. The method of any one of Aspect 1-Aspect 4, Aspect 7, or Aspect 9-Aspect 14, wherein the catalyst comprises an Ni—Pd, Ni—Cu, or Ni—Sn bimetallic catalyst and the support comprises a supporting solid carbon product.

Aspect 16. The method of any one of Aspect 1, Aspect 6-Aspect 7, or Aspect 9-Aspect 14, wherein the catalyst comprises an Ni—Pd, Ni—Cu, or Ni—Sn bimetallic catalyst and the catalyst is unsupported.

Aspect 17. The method of any one of Aspect 1-Aspect 4, Aspect 7, or Aspect 9-Aspect 14, wherein the catalyst comprises an Ni—Pd, Ni—Cu, or Ni—Sn bimetallic catalyst and the support comprises SiC.

Aspect 18. The method of any one of Aspect 1-Aspect 5 or Aspect 7-Aspect 14, wherein the catalyst is monometallic, bimetallic, or trimetallic and comprises Co, Ni, Mo, Pt, Pd, Mn or a combination thereof, and wherein the support comprises an aerogel.

Aspect 19. The method of any one of Aspect 15, Aspect 17, or Aspect 18, wherein the catalyst comprises Ni—Pd and wherein the ratio of Ni:Pd:support is from about 8:1:91 to about 12:1:87; about 9:1:90 to about 12:1:87; about 10:1:89 to about 12:1:87; about 11:1:88 to about 12:1:87; about 8:1:91; about 9:1:90; about 10:1:89; about 11:1:88; or about 12:1:87.

Aspect 20. The method of any one of Aspect 15, Aspect 17, or Aspect 18, wherein the catalyst comprises Ni—Pd and wherein the ratio of Ni:Pd:support is 10:1:89.

Aspect 21. The method of any one of Aspect 1-Aspect 19, wherein the solid carbon product and the supporting solid carbon product independently comprise nanoparticles, fullerenes, carbon filaments, single-walled carbon nanotubes, multi-walled carbon nanotubes, carbon nanofibers, or a combination thereof.

Aspect 22. The method of Aspect 21, wherein the solid carbon product and the supporting solid carbon product independently comprise single-walled carbon nanotubes, multi-walled carbon nanotubes, carbon nanofibers, or a combination thereof.

Aspect 23. The method of Aspect 22, wherein the single-walled carbon nanotubes, multi-walled carbon nanotubes, or carbon nanofibers have an outer diameter from about 10 nm to about 500 nm.

Aspect 24. The method of Aspect 23, wherein the single-walled carbon nanotubes, multi-walled carbon nanotubes, or carbon nanofibers have an outer diameter from about 15 nm to about 300 nm.

Aspect 25. The method of Aspect 22, wherein the single-walled carbon nanotubes, multi-walled carbon nanotubes, or carbon nanofibers have a length from about 20 nm to about 50 μm.

Aspect 26. The method of Aspect 25, wherein the single-walled carbon nanotubes, multi-walled carbon nanotubes, or carbon nanofibers have a length from about 50 nm to about 25 μm.

Aspect 27. The method of any one of Aspect 1-Aspect 4, further comprising step (f): using a portion of the at least one solid carbon product as a supporting solid carbon product to restart the method beginning at step (a).

Aspect 28. The method of Aspect 27, wherein from about 5 wt % to about 90 wt % of the solid carbon product is used to restart the method at step (a).

Aspect 29. The method of Aspect 27, wherein from about 10 wt % to about 50 wt % of the solid carbon product is used to restart the method at step (a).

Aspect 30. The method of any one of Aspect 1-Aspect 29, wherein in step (c), the acid composition comprises nitric acid.

Aspect 31. The method of Aspect 30, wherein the nitric acid is from about 0.5 M to about 12 M.

Aspect 32. The method of Aspect 30, wherein the nitric acid is from about 2.5 M to about 4 M.

Aspect 33. The method of Aspect 30, wherein step (c) is carried out for from about 3 to about 5 hours at a temperature from about 110° C. to about 130° C.

Aspect 34. The method of Aspect 30, wherein following step (c), the solid carbon product and the catalyst are contacted with a second acid composition.

Aspect 35. The method of Aspect 34, wherein the second acid composition comprises nitric acid.

Aspect 36. The method of Aspect 35, wherein the second acid composition comprises concentrated nitric acid.

Aspect 37. The method of 49, wherein the solid carbon product and the catalyst are contacted with the second acid composition for 12 hours from about 130° C. to about 150° C.

Aspect 38. The method of any one of Aspect 27-Aspect 29, wherein step (f) is repeated at least four times.

Aspect 39. The method of any one of Aspect 1-Aspect 38, wherein the method is conducted in an inert atmosphere.

Aspect 40. The method of Aspect 39, wherein the inert atmosphere comprises nitrogen, argon, or a combination thereof.

Aspect 41. The method of Aspect 40, wherein the inert atmosphere comprises nitrogen.

Aspect 42. The method of any one of Aspect 1-Aspect 41, wherein gas hourly space velocity is from about $5,000^{-1}$ to about $50,000$ $h^{-1}$.

Aspect 43. The method of any one of Aspect 1-Aspect 42, wherein the microwave radiation induces a temperature in the catalyst from about 400° C. to about 700° C.

Aspect 44. The method of any one of Aspect 1-Aspect 42, wherein the microwave radiation induces a temperature in the catalyst from about 550° C. to about 600° C.

Aspect 45. The method of any one of Aspect 1-Aspect 44, wherein the method is performed from about 1 atm to about 20 atm.

Aspect 46a. The method of any one of Aspect 1-Aspect 45, wherein the microwave radiation is applied at a power from about 20 W to about 10 MW.

Aspect 46b. The method of any one of Aspect 1-Aspect 45, wherein the microwave radiation is applied at a power from about 200 W to about 10 MW.

Aspect 47. The method of any one of Aspect 1-Aspect 46b, wherein the microwave radiation has a frequency from about 915 MHz to about 20 GHz.

Aspect 48. The method of any one of Aspect 1-Aspect 47, wherein the method is carried out for a period from about 5 min to about 800 min.

Aspect 49. The method of any one of Aspect 1-Aspect 48, wherein the at least one solid carbon product is produced via a tip growth mechanism, a base growth mechanism, or a combination thereof.

Aspect 50. The method of any of the preceding claims, wherein at least 5% of the hydrocarbon gas is converted.

Aspect 51. The method of any of the preceding claims, wherein at least 30% of the hydrocarbon gas is converted.

Aspect 52. The method of any of the preceding claims, wherein at least 50% of the hydrocarbon gas is converted.

Aspect 53. A composition comprising hydrogen and at least one solid carbon product, produced by the method of any of the preceding claims.

Aspect 54. A method for making an aerogel-supported catalyst useful for microwave-assisted conversion of methane, the method comprising: (a) admixing a catalyst precursor compound and an aerogel precursor compound to create a first mixture; (b) adding a first solvent to the first mixture to create a second mixture; (c) agitating the second mixture for a first time period; (d) heating the second mixture at a first temperature for a second time period; (e) cooling the second mixture to a second temperature; (f) adding a gelation agent to the second mixture to form a third mixture; (g) incubating the third mixture at a third temperature for a third time period; (h) washing the third mixture with a second solvent; (i) soaking the third mixture with a third solvent for a fourth time period; and (j) vacuum drying the third mixture for a fifth time period.

Aspect 55. The method of Aspect 54, wherein the catalyst precursor compound comprises $Ni(NO_3)_2 \cdot 6H_2O$, $Co(NO_3)_2 \cdot 6H_2O$, $Fe(NO_3)_3 \cdot 6H_2O$, $Pd(NO_3)_2 \cdot 6H_2O$, or any combination thereof.

Aspect 56. The method of Aspect 54 or Aspect 55, wherein the aerogel precursor compound comprises $AlCl_3 \cdot 6H_2O$.

Aspect 57. The method of any one of Aspect 54-Aspect 56, wherein the first solvent comprises water, ethanol, or a combination thereof.

Aspect 58. The method of any one of Aspect 54-Aspect 57, wherein the first time period is from about 30 min to about 45 min.

Aspect 59. The method of any one of Aspect 54-Aspect 57, wherein the first time period is about 30 min.

Aspect 60. The method of any one of Aspect 54-Aspect 58, wherein the first temperature is from about 75° C. to about 85° C.

Aspect 61. The method of any one of Aspect 54-Aspect 58, wherein the first temperature is about 80° C.

Aspect 62. The method of any one of Aspect 54-Aspect 61, wherein the second time period is from about 1 to about 1.5 h.

Aspect 63. The method of any one of Aspect 54-Aspect 61, wherein the second time period is about 1 h.

Aspect 64. The method of any one of Aspect 54-Aspect 63, wherein the second temperature is from about −5° C. to about 0° C.

Aspect 65. The method of any one of Aspect 54-Aspect 63, wherein the second temperature is about 0° C.

Aspect 66. The method of any one of Aspect 54-Aspect 65, wherein the gelation agent comprises propylene oxide, ethylene glycol, hexylene glycol, or a combination thereof.

Aspect 67. The method of any one of Aspect 54-Aspect 66, wherein the third temperature is from about 20° C. to about 30° C.

Aspect 68. The method of any one of Aspect 54-Aspect 66, wherein the third temperature is about 20° C.

Aspect 69. The method of any one of Aspect 54-Aspect 68, wherein the third time period is from about 30 min to about 50 min.

Aspect 70. The method of any one of Aspect 54-Aspect 68, wherein the third time period is about 35 min.

Aspect 71. The method of any one of Aspect 54-Aspect 70, wherein the second solvent comprises water.

Aspect 72. The method of any one of Aspect 54-Aspect 71, wherein the third solvent comprises ethanol.

Aspect 73. The method of any one of Aspect 54-Aspect 72, wherein the fourth time period is from about 11 h to about 13 h.

Aspect 74. The method of any one of Aspect 54-Aspect 72, wherein the fourth time period is about 12 h.

Aspect 75. The method of any one of Aspect 54-Aspect 74, wherein the fifth time period is from about 8 h to about 10 h.

Aspect 76. The method of any one of Aspect 54-Aspect 74, wherein the fifth time period is about 9 h.

Aspect 77. The method of any one of Aspect 54-Aspect 76, wherein the aerogel-supported catalyst comprises $Ni/Al_2O_3$.

Aspect 78. The method of Aspect 54, further comprising step (h1): reducing the catalyst at a fourth temperature for a sixth time period.

Aspect 79. The method of Aspect 78, wherein the fourth temperature is from about 465 to about 475° C.

Aspect 80. The method of Aspect 78, wherein the fourth temperature is about 470° C.

Aspect 81. The method of any one of Aspect 78-Aspect 80, wherein the sixth time period is from about 2.5 to about 3 h.

Aspect 82. The method of any one of Aspect 78-Aspect 80, wherein the sixth time period is about 2.5 h.

Aspect 83. The method of any one of Aspect 54-Aspect 76, wherein the aerogel-supported catalyst comprises $Co/Al_2O_3$.

Aspect 84. The method of Aspect 54, further comprising step (h2): calcining the catalyst at a fifth temperature for a seventh time period.

Aspect 85. The method of Aspect 84, wherein the fifth temperature is from about 495° C. to about 505° C.

Aspect 86. The method of Aspect 84, wherein the fifth temperature is about 500° C.

Aspect 87. The method of any one of Aspect 84-Aspect 86, wherein the seventh time period is from about 3 h to about 3.5 h.

Aspect 88. The method of any one of Aspect 84-Aspect 86, wherein the seventh time period is about 3 h.

Aspect 89. The method of any one of Aspect 83-Aspect 88, further comprising step (i): reducing the catalyst at a sixth temperature for an eighth time period.

Aspect 90. The method of Aspect 89, wherein the sixth temperature is from about 545° C. to about 555° C.

Aspect 91. The method of Aspect 89, wherein the sixth temperature is about 550° C.

Aspect 92. The method of any one of Aspect 89-Aspect 91, wherein the eighth time period is from about 2.5 h to about 3 h.

Aspect 93. The method of any one of Aspect 89-Aspect 91, wherein the eighth time period is about 2.5 h.

From the foregoing, it will be seen that aspects herein are well adapted to attain all the ends and objects hereinabove set forth together with other advantages which are obvious and which are inherent to the structure.

While specific elements and steps are discussed in connection to one another, it is understood that any element and/or steps provided herein is contemplated as being combinable with any other elements and/or steps regardless of explicit provision of the same while still being within the scope provided herein.

It will be understood that certain features and sub-combinations are of utility and may be employed without reference to other features and sub-combinations. This is contemplated by and is within the scope of the claims.

Since many possible aspects may be made without departing from the scope thereof, it is to be understood that all matter herein set forth or shown in the accompanying drawings and detailed description is to be interpreted as illustrative and not in a limiting sense.

It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1: Aerogel Catalyst Development

Initially, Ni and Co aerogel catalysts were developed for the methane decomposition. Aerogel catalysts ($Ni/Al_2O_3$ and $Co/Al_2O_3$) were prepared using a modified sol-gel method. Compared to catalysts prepared by conventional incipient wetness technique, the obtained aerogel catalysts showed higher activity, stability, and reproducibility.

Chemicals

Analytical grade chemicals including $AlCl_3 \cdot 6H_2O$, $Ni(NO_3)_2 \cdot 6H_2O$, $Co(NO_3)_2 \cdot 6H_2O$, ethanol (anhydrous), and propylene oxide (99%) were purchased from Acros Organics and used as received without further purification. Deionized water was used in preparing the metal solutions.

Synthesis of First-Generation Aerogel Catalysts $Ni/Al_2O_3$ and $Co/Al_2O_3$ aerogels were synthesized by a modified sol-gel method. Described herein is the preparation of 2.0 g of 50 wt % $Ni/Al_2O_3$ aerogel catalyst (50 wt % metal on 50 wt % $Al_2O_3$ support) as an example. In the preparation, 4.74 g of $AlCl_3 \cdot 6H_2O$ was mixed with 4.95 g of $Ni(NO_3)_2 \cdot 6H_2O$, followed by addition of 10 mL of deionized water and 15.5 mL of anhydrous ethanol with vigorous agitation for 30 min. The beaker containing the solution was sealed and then heated in an oil bath at 80° C. for 1 h. The solution was cooled to room temperature and transferred to an ice bath to which 16 mL of propylene oxide (PO) was added. The solution was allowed to sit at room temperature without agitation for 35 min so that the wet gel would form. After that, the wet gel was washed with deionized water three times and soaked in anhydrous ethanol overnight to promote the ethanol into the pores. The resulted wet gel was then vacuum-dried for 9 h to obtain aerogel (FIGS. 5A-5F).

Figure 7B:
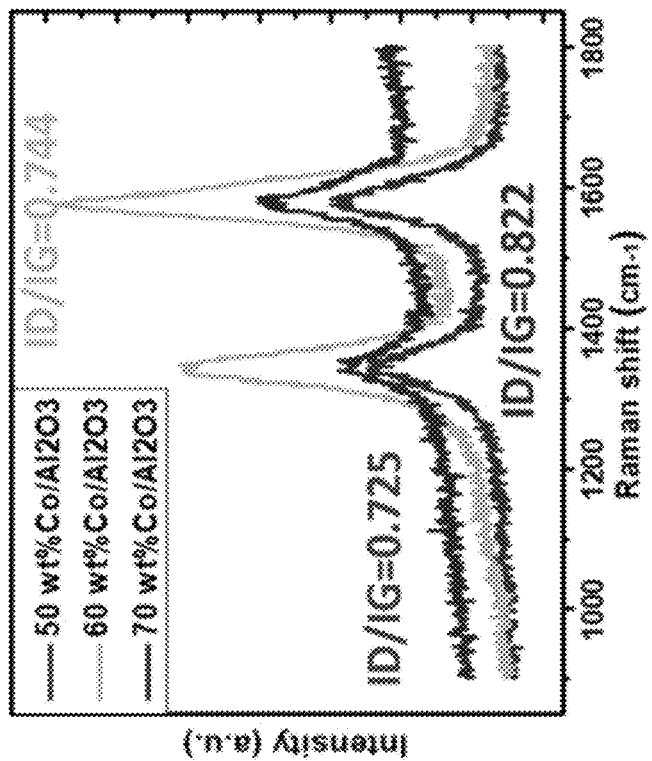
FIG. 7B shows Raman spectra of CNTs produced using a Co/Al$_2$O$_3$ aerogel catalyst.
Figure 7A:
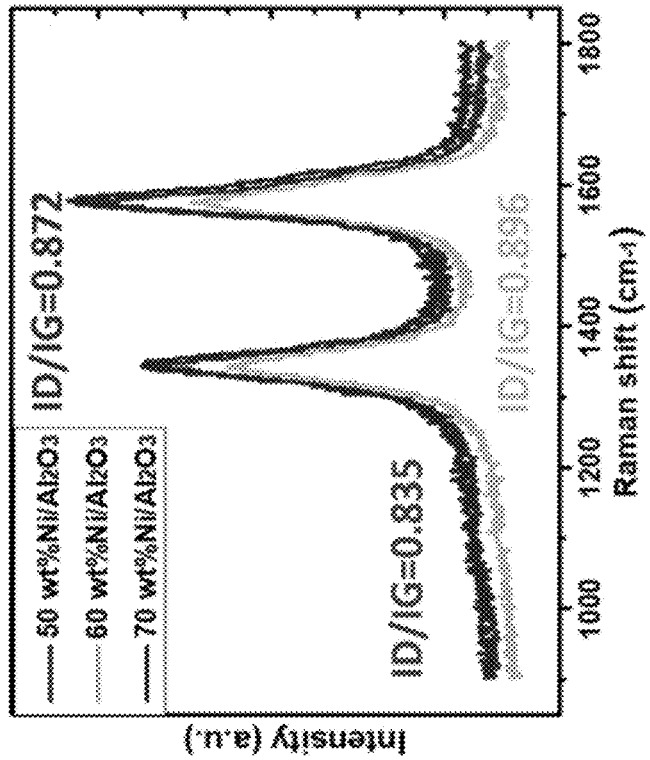
FIG. 7A shows Raman spectra of CNTs produced using an Ni/Al$_2$O$_3$ aerogel catalyst.

$H_2$ temperature programmed reduction (TPR) tests were performed to identify the optimal reduction temperatures of $Ni/Al_2O_3$ and $Co/Al_2O_3$ aerogel catalysts in our previous work. The first peak at 368° C. was assigned to the reduction of NiO, which was weakly bonded with the $Al_2O_3$ support. The second peak at 472° C. was attributed to the reduction of NiO species, which strongly interacted with the $Al_2O_3$ support in $Ni/Al_2O_3$ aerogel. Two reduction peaks were observed in TPR at 308 and 470° C. in the $Co/Al_2O_3$ aerogel catalysts, which corresponded to the two-step reduction of spinel (i.e., $Co_3O_4$ CoO→Co). TPR profiles suggested a higher reduction temperature was crucial for improving the reduction of NiO and CoO in aerogel catalysts. Considering the different properties of $Ni/Al_2O_3$ and $Co/Al_2O_3$ aerogel catalysts in high operation temperature, prior to reaction, the $Ni/Al_2O_3$ aerogel catalyst was reduced at 470° C. for 2.5 h and the $Co/Al_2O_3$ aerogel catalysts were calcined at 500° C. for 3 h and reduced at 550° C. for 2.5 h. The preparation method was essentially the same as used in the $Ni/Al_2O_3$ aerogel catalyst for $Co/Al_2O_3$ aerogel catalyst. TEM images of CNTs produced from an $Ni/Al_2O_3$ aerogel catalyst are seen in FIGS. 5A-5F, while Raman spectroscopy of CNTs from the same catalyst are seen in FIGS. 7A-7B.

Catalyst Characterization

The XRD measurements were performed on a PANalytical X'pert Pro X-ray diffractometer using Cu Kα radiation, where the step scans were taken over the range 10-80°. Morphologies and microstructures of the aerogels, catalysts, and CNTs were characterized by transmission electron microscopy (TEM) on a JEOL JEM-2100. TEM samples were prepared by sonication of the products in isopropanol, and a copper grid was used to load the suspension. Scanning electron microscopic (SEM) images were acquired on a Hitachi S-4700 scanning electron microscope. Element contents on the catalyst surfaces were identified by energy dispersive X-ray spectroscopic (EDS) measurements (Superscan SSX-550, Shimazu). Raman analyses were performed on a Renishaw InVia Raman spectrometer, where the Raman spectra were recorded using a green excitation line at 532 nm. Thermogravimetric analysis (TGA) was performed using a TA_SDT-650_Discovery model instrument in 5% $O_2$/He atmosphere; temperature was ramped from 150 to 900° C. at a heating rate of 10° C./min. Brunauer-Emmett-Teller (BET) analysis was carried out on an ASAP 2020 instrument using nitrogen at 77 K.

Challenges with First-Generation Catalysts

Figure 8:
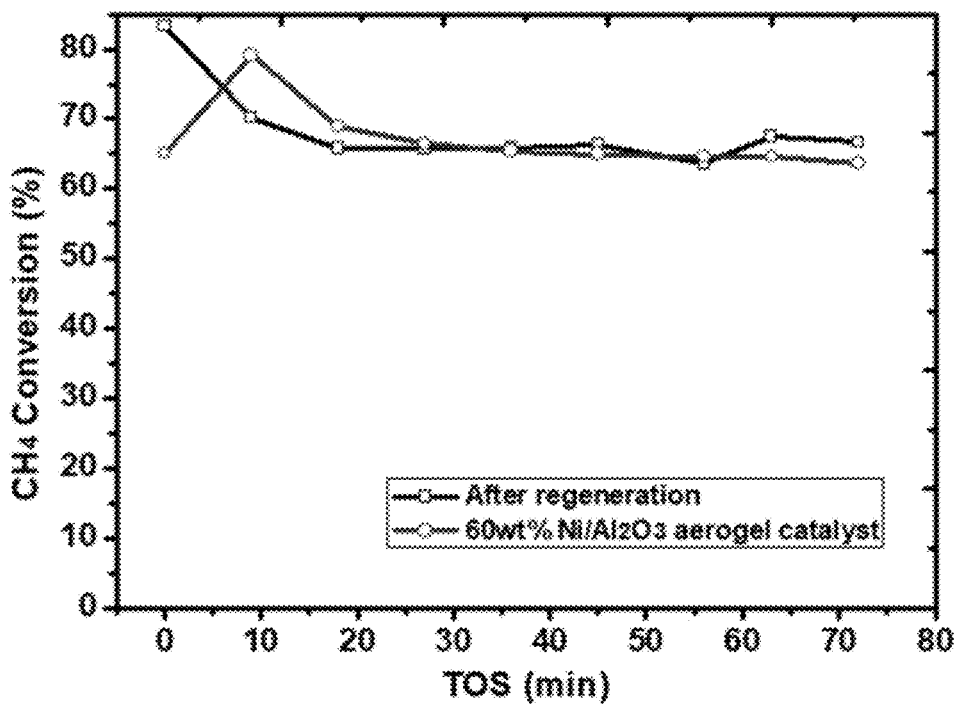
FIG. 8 shows performance of an Ni/Al$_2$O$_3$ aerogel catalyst in methane decomposition before (red line) and after (black line) regeneration. GHSV=42,000 h$^{-1}$, 650° C.

Although the first generation exhibited good performance with respect to carbon nanomaterials preparation and hydrogen production (FIG. 8), separation of the produced carbon remained a challenge. The second-generation catalyst was developed to overcome this difficulty.

In the first-generation of catalyst, $Al_2O_3$ aerogel support is required during the decomposition reaction and should be able to be reused after catalyst regeneration. Industrial scale-up requires keeping a large inventory of $Al_2O_3$ aerogel support, for example, in commercial operations. In developing the second-generation catalyst, efforts were made to use product CNTs/CNFs as catalyst support and elimination of the use of catalyst support was attempted for some experiments.

Second-Generation Catalysts

The second-generation catalyst is consisted of a nickel-based metal and CNT support. Alkali metal or other transitional metal could also be mixed as electron promotors. A typical catalyst preparation process began with templating Ni and Pd on CNTs/CNFs. $Ni(NO_3)_2$, $Pd(NO_3)_2$, and CNT solid powders were dissolved in 50 mL acetone. The mass ratio of Ni:Pd:C was calculated as 10:1:89. The solution was then sonicated and placed into a sealed autoclave for 110° C. for about 12 hours to help template the metal ions on CNTs. The solution was then vented and the solids were collected and dried in an oven for over 24 hours. Reduction of the solids was carried out in a tube furnace with a hydrogen flow balanced by nitrogen (7% hydrogen) for about 4 hours. The resulting solids were collected and used later as catalyst for methane decomposition.

Figure 3:
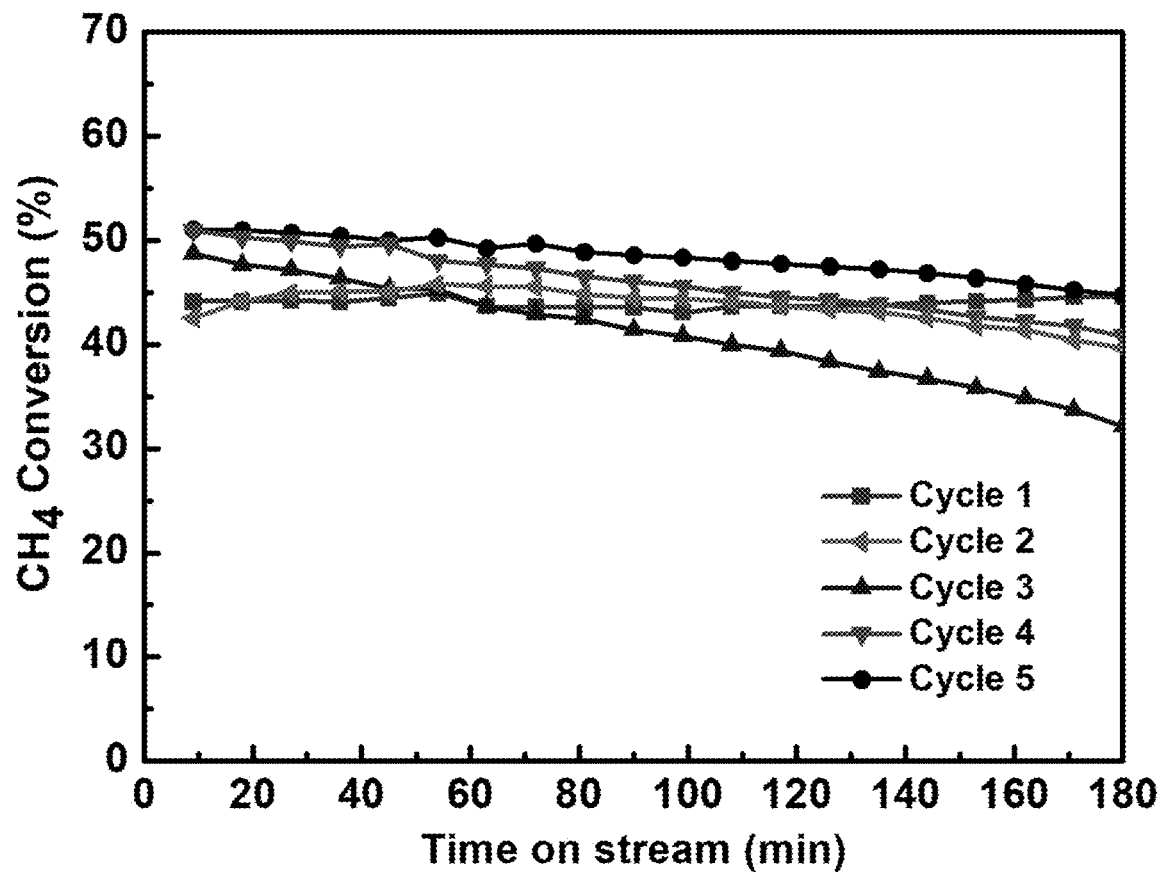
FIG. 3 shows catalytic methane decomposition over time for Ni—Pd supported on in-process produced CNTs/CNFs at 600° C. Similar rates of methane conversion are observed over multiple reaction cycles.
Figures 4A, 4B:
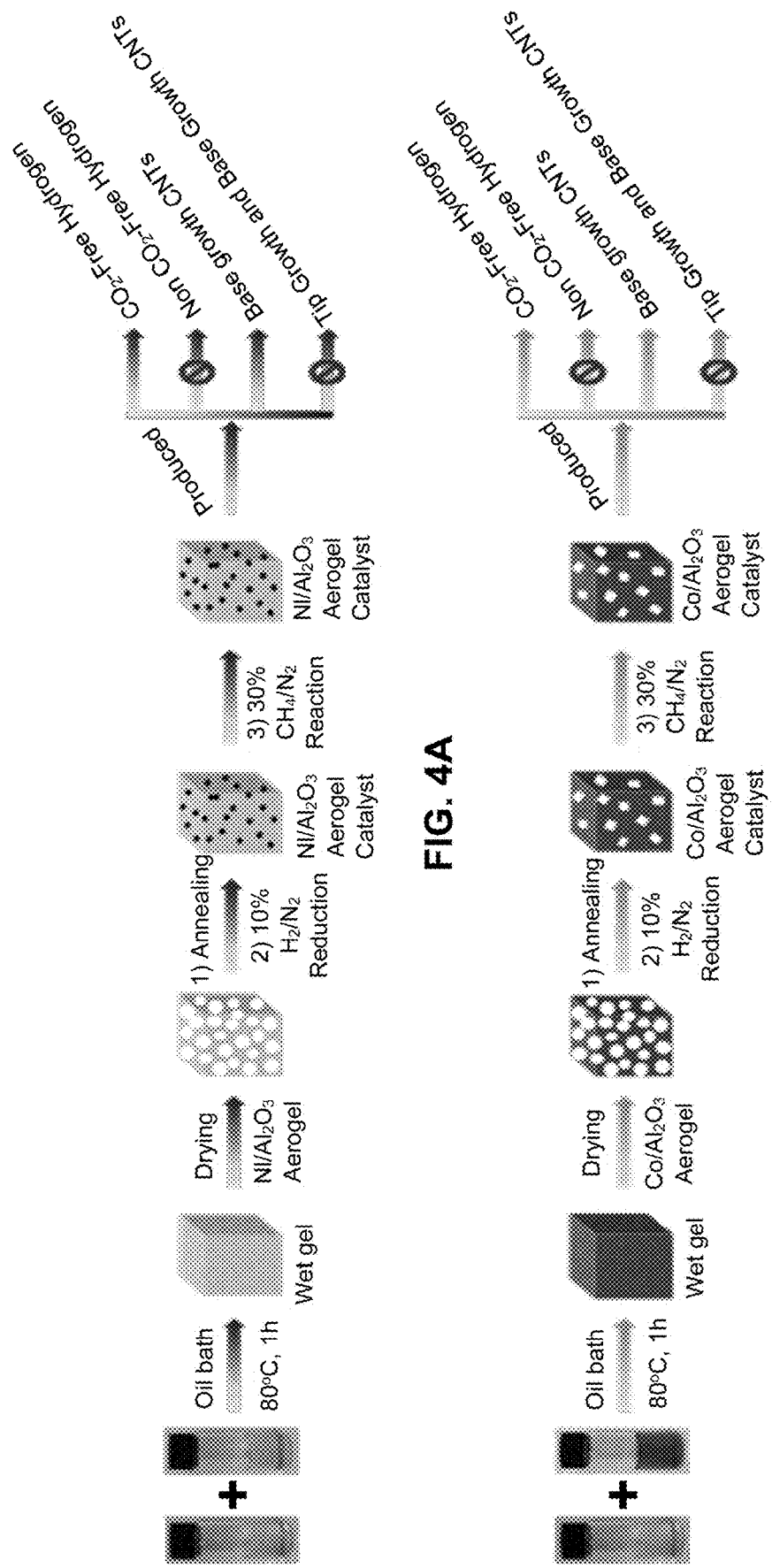
FIGS. 4A-4B show representative synthesis processes for preparation of disclosed aerogel catalysts using a modified sol-gel method. Compared to catalysts prepared by the conventional incipient wetness technique, the aerogel catalysts showed higher activity, stability, and reproducibility.
Figure 6A:
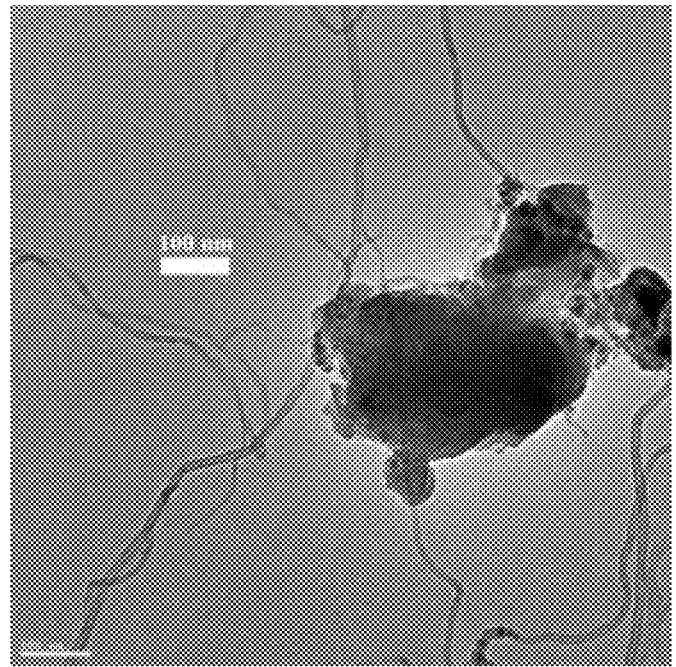
FIGS. 6A-6B show TEM images of CNTs at different scales produced according to the microwave catalytic decomposition of methane process disclosed herein.
Figure 6B:
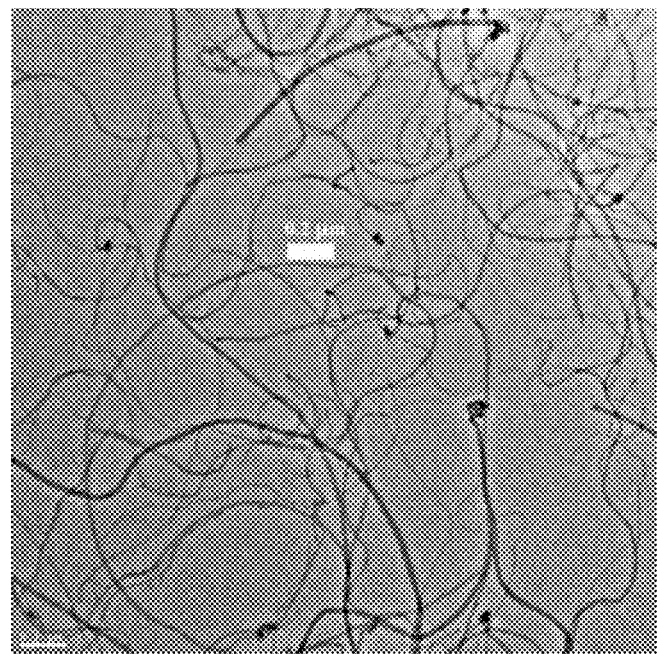

The catalyst and reaction process were designed in such a way that a portion of the solid carbon produced was used as the catalyst support for making the catalyst to be used in the next cycle. The carbon products are resistant to various organic or inorganic solutions and can be easily recovered and separated from metal solution. Following separation, the metal has been recycled and thus remains in the process. There is no need to add catalyst externally because the catalyst is synthesized using a portion of the CNTs/CNFs product and recycled metals in acid wash. This process can be repeated for five or more reaction cycles (FIG. 3). TEM images of CNTs produced by microwave catalytic decomposition of methane are shown in FIGS. 6A-6B.

Example 2: Carbon-Supported Catalyst Preparation and Cyclic Operation 20-30 nm multiwalled carbon nanotubes (MWCNT) were purchased from Cheap Tubes, Inc. (Grafton, VT) and stirred under reflux with 70 mL concentrated $HNO_3$ at 140° C. for 12 h before synthesizing catalyst (designated H-CNT). In some experiments, MWCNT and single-walled CNT with other dimensions were used. Monometallic Ni and bimetallic Ni (10 wt %) and Pd (1 wt %) catalysts supported over H-CNT were prepared using a facile solvothermal synthesis method. Precursor compounds $Ni(NO_3)_2.6H_2O$ and $Pd(NO_3)_2.2H_2O$ were dissolved in 50 mL acetone and H-CNT was added into the solution. The mixture was stirred for 3 or 4 h and subsequently sonicated for 30 min. The resulting heterogeneous mixture was transferred to a 100 mL Teflon-lined stainless steel autoclave, sealed, and kept in an oven at 120° C. for 12 h. Then the mixture was cooled slowly to room temperature with the solid particles precipitating at the bottom of the container. The supernatant was slowly decanted. In some experiments, instead of decanting, the autoclave was placed in a fume hood to evaporate acetone at room temperature. Finally, the wet particles left over after the supernatant was removed by either method were dried slowly at room temperature and then transferred to an 80° C. oven for 5 h. Unsupported catalysts were prepared following essentially the same protocol; however, the metal precursors were dissolved in 100 mL solvent and a 150 mL autoclave was used for these experiments.

Pretreatment of Carbon Nanotubes

Due to concerns about residual metals remaining on pristine CNT, which would affect results, CNT are typically pretreated using an acid wash as described above. In some experiments, pristine commercial CNT were used as support without acid wash. It was observed that CNT exhibited only very low activity. Our results demonstrate that using pristine CNT without pretreatment does not seem to affect performance tests.

Example 3: Carbon Catalyst Recycling

After the reaction, the spent catalysts were refluxed with 3M $HNO_3$ at 120° C. for 4 h and concentrated $HNO_3$ at 140° C. for 12 h under continuous agitation (i.e., magnetic stirring). After the reflux, the carbon particles were filtered and washed with deionized water. Then, the carbon particles were dried at 80° C. and some portion of carbon particles were ready for the next cycle. The preparation of fresh catalysts for the following cycles was the same as for the first cycle by the solvothermal synthesis method described previously. After 5 cycles, only CNTs and CNFs were produced, with other types of carbon structures not being observed.

Quality of growing carbon from each cycle was examined by Raman spectroscopy. After acid treatment, the ID/IG ratio increases since strong acids can cause defects or breaks in CNT/CNF. For spent catalysts obtained from cycles 1, 3, and 5, the ID/IG ratio is around 0.85. Thus, the quality of the carbon nanomaterials produced essentially does not change after 5 cycles of operation.

Example 4: Preparation of Carbon Nanomaterials

Conventional Heating

Methane conversion was carried out with a vertical tube furnace. The temperature of the reaction was set at 600° C. The gas feed had a flow rate of 30 sccm with 30% methane and 70% nitrogen. Typically, an 0.2 gram of Ni—Pd@CNTs catalyst were used in the reaction and the CNTs/CNTs was later separated by acid treatment to remove impurities.

Microwave Heating

Figure 11:
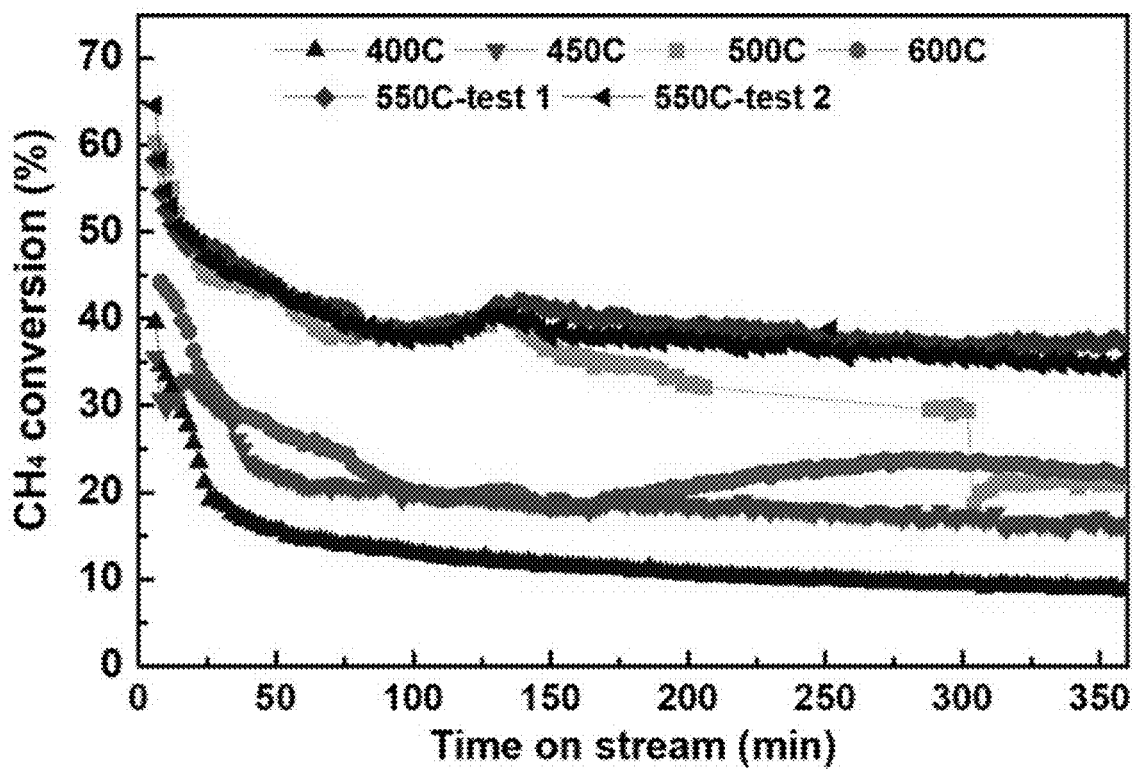
FIG. 11 shows the performance of Ni—Pd/CNT catalysts for methane decomposition under microwave heating conditions at different temperatures.
Figure 12:
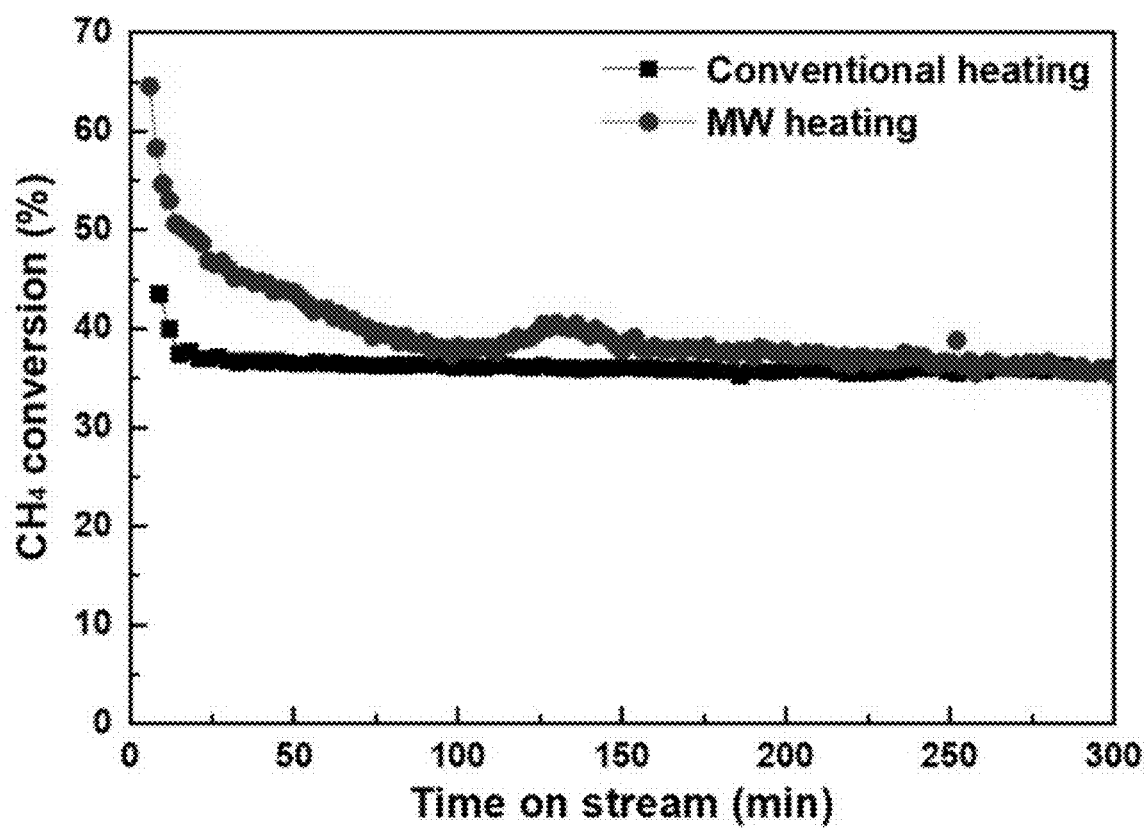
FIG. 12 shows methane conversion at 550° C. for conventional (black line) and microwave (red line) heating using the same Ni—Pd/CNT catalyst.

Microwave catalytic methane conversion was carried out with a variable frequency microwave reactor (Lambda MC1330-200). The methane decomposition reaction ran at gradient temperatures from 400 to 600° C. with an interval of 50° C. Typically, 0.2 gram of Ni—Pd@CNTs catalyst was used in the reaction. The gas feed had a flow rate of 30 sccm with 30% methane and 70% nitrogen. The microwave was set on a fixed frequency (5.85 GHz). Since 550° C. was observed with the best performance in term of methane conversion rate, the temperature has been run twice to ensure reproducible results. Methane conversion as a function of time on stream at different temperatures is shown in FIG. 11. Methane conversion at 550° C. under conventional and microwave heating with the same catalyst (Ni—Pd/CNT) is shown in FIG. 12.

Example 5: Catalyst Performance

Conventional Heating of Second-Generation Catalysts

A Ni—Pd metallic catalyst was recently demonstrated to achieve high activity and stability for methane pyrolysis using a bench-scale fixed bed reactor. Ni—Pd catalyst, either unsupported or with CNT support, achieved approximately 55% and 45% conversion, respectively, when reacted at 600° C. Further, conversion levels remained level for the 6-hour duration of the experiment. By contrast, a comparative monometallic Ni/CNT catalyst quickly deactivated, and an unsupported Ni catalyst exhibited low initial activity. Thus, Ni catalytic stability is greatly enhanced with Pd promotion. TEM analysis of the spent bimetallic catalysts, both with and without CNT support, revealed the formation of CNT-rich product. Resulting bimetallic Ni—Pd particle sizes were relatively large for both the CNT-supported (20-50 nm) and unsupported (100 nm-1 μm) catalysts.

Microwave Heating of Second-Generation Catalysts

The Ni—Pd@CNTs were tested for methane decomposition to CNTs/CNFs and hydrogen. The results show that the methane conversion reaches the highest level at 550° C. and maintains a conversion above 35% for up to 350 min. The reaction was repeated at this temperature, with results indicating that the performance is reproducible. Microwave heating exhibits a higher average conversion than conventional heating. Other advantages over conventional heating are that microwave irradiation can selectively heat the metal ions in the catalyst, and heat can be instantly removed by stopping the irradiation.

In a 180 W variable frequency microwave reactor, methane pyrolysis was conducted to co-produce hydrogen and CNTs over selected catalysts. Interestingly, much longer CNTs are produced compared with those from non-microwave conditions.

Due to the selective heating of metals on the catalyst surface, although the bulk (support) temperature of the catalyst is 375° C., the metal site temperature is high enough to catalyze the decomposition reaction compared to conventional heating where heat is transferred from an external furnace to a rector wall and then to the catalyst support before active sites are heated. In contrast, the microwave reactor delivers electromagnetic energy to active sites directly, therefore energy savings can be achieved. In commercial operations, waste heat from catalyst regeneration can be utilized to preheat the feedstock and microwave energy only used for C—H bond activation.

Figure 9:
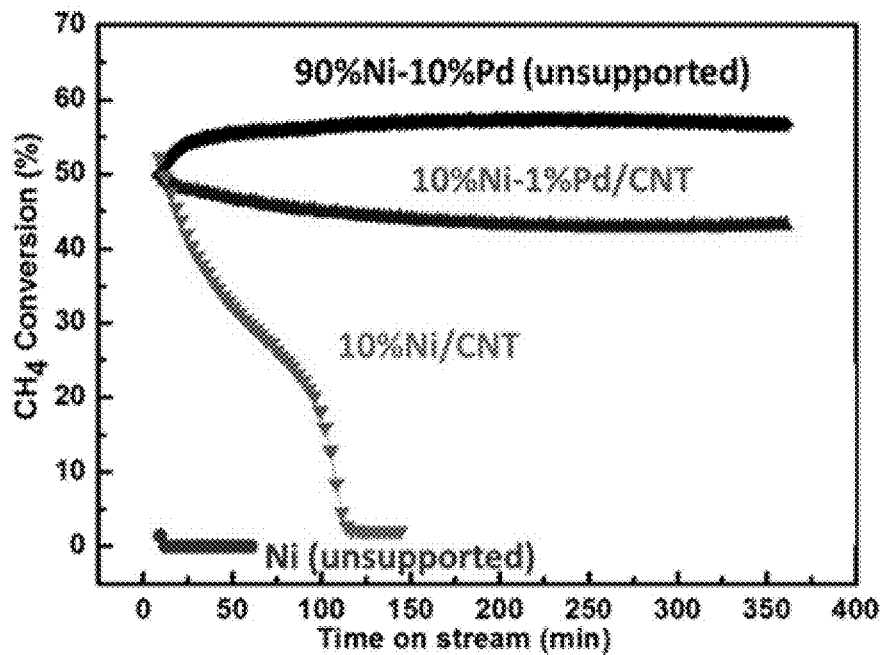
FIG. 9 shows methane conversion as a function of time-on-stream for Ni—Pd and Ni catalysts, with and without CNT support (600° C., 1 atm, 10,000 h$^{-1}$, 30% CH$_4$/N$_2$).

Methane conversion as a function of time-on-stream for NiPd and Ni catalysts, with and without CNT support, is shown in FIG. 9.

Example 6: Quality of Carbon Materials Produced

CNT quality was characterized by Raman spectroscopy and thermogravimetric analysis (TGA). In Raman characterization, the G-band represents CNTs, whereas the D-band represents defect CNTs that are still crystalline in structure. TGA verified both D and G bands belong to crystalline carbon.

Figures 14A, 14B:
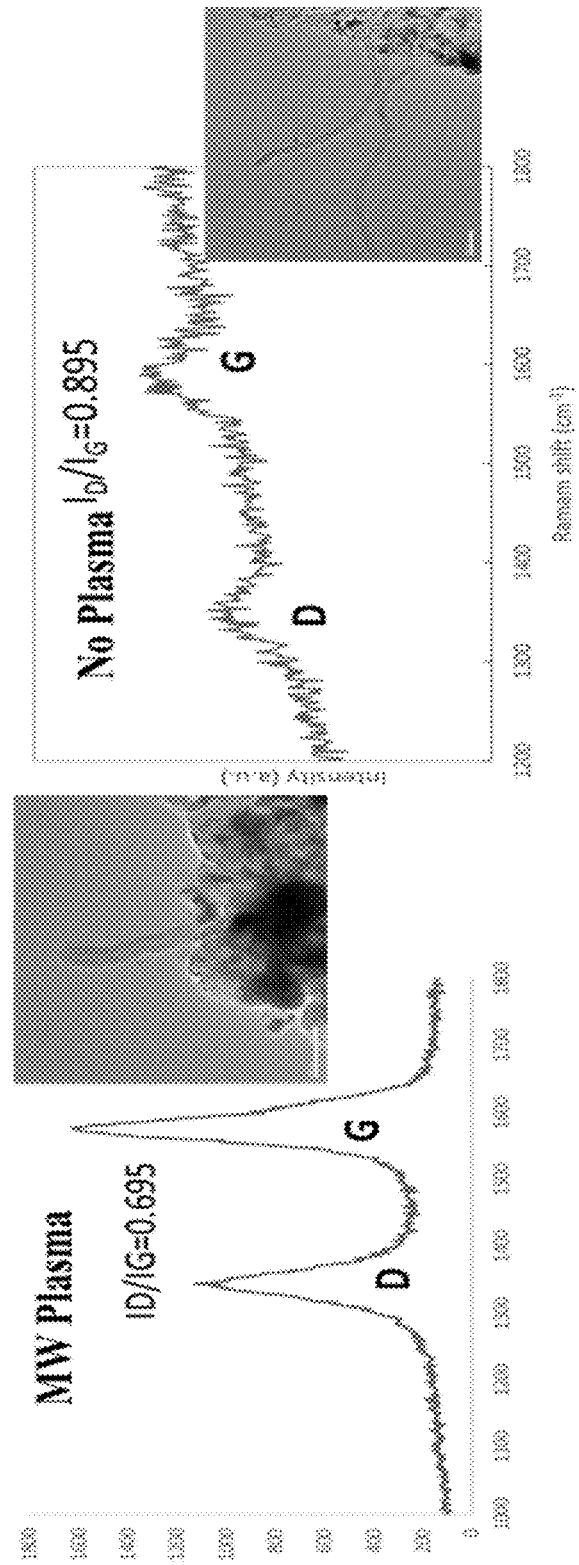
FIG. 14A shows a Raman spectrum and TEM image for methane decomposition over an Fe/Al$_2$O$_3$ catalyst in the presence of microwave plasma.
FIG. 14B shows a Raman spectrum and TEM image for methane decomposition over an Fe/Al$_2$O$_3$ catalyst in the absence of microwave plasma.

We have discovered that Raman spectra indicate that the yield of desired CNTs (G-band on Raman) increase when microwave irradiation begins. The effect of microwave on CNTs yield improvement is due to the activation of metals on catalyst sites (see FIGS. 14A-14B).

Example 7: Separation of Carbon Materials and Catalyst Regeneration

Figure 10B:
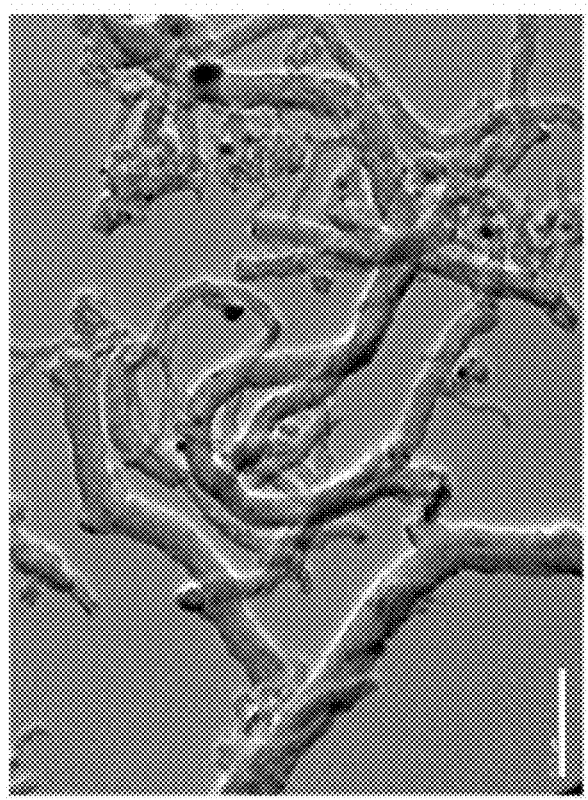
FIGS. 10A-10B show TEM images for (FIG. 10A) spent 10% Ni-1% Pd/CNT and for (FIG. 10B) spent unsupported 90% Ni-10% Pd catalyst after one cycle of the reaction disclosed herein.
Figure 10A:
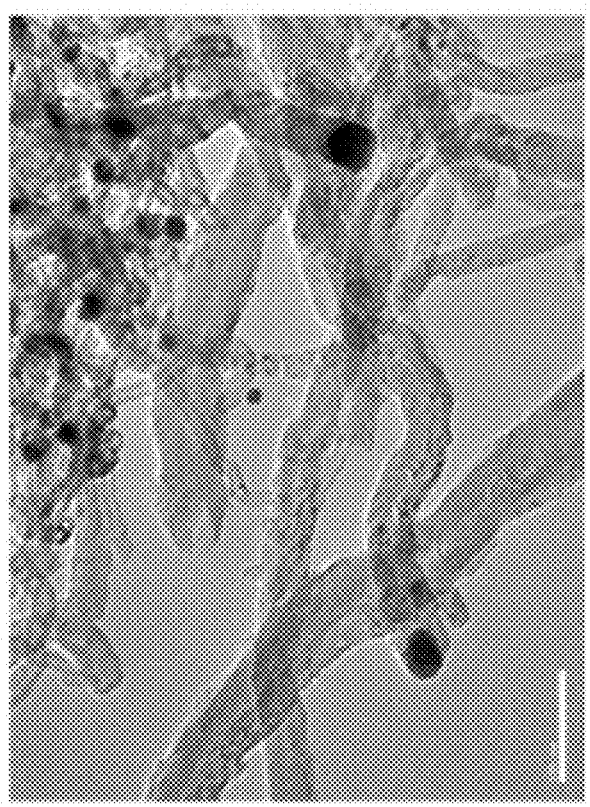

CNT separation from the catalyst was accomplished by using 1N $HNO_3$ to selectively dissolve metals that connect CNTs with an aerogel support. After acid wash, regeneration is carried out by calcination to remove residual carbon. Reimpregnation to add more metal may be needed every 5 regeneration cycles. After regeneration, catalyst activity is fully recovered. TEM images of spent/CNT supported and spent unsupported Ni—Pd catalysts are shown in FIGS. 10A-10B.

Example 8: Methane Pyrolysis—Effect of Flow Rate on Methane Conversion

Figure 15B:
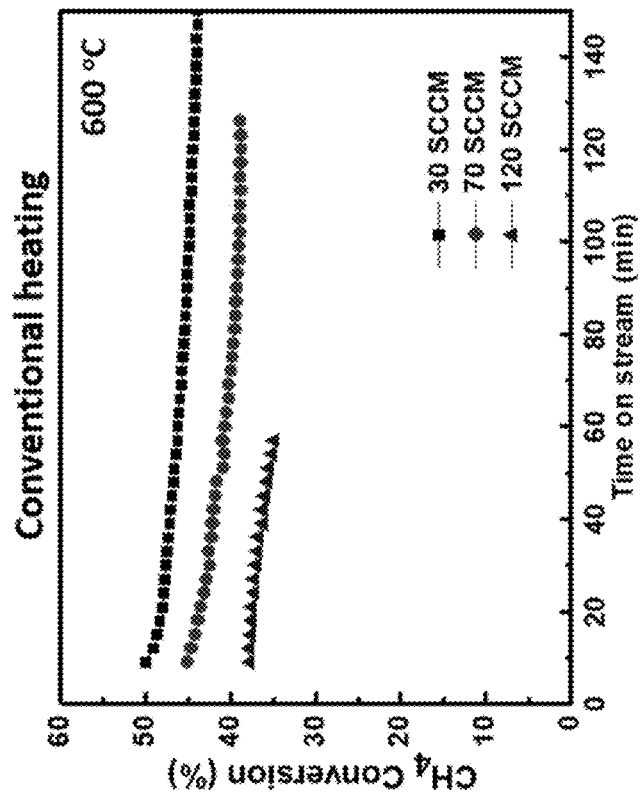
FIGS. 15A-15B show the effect of flow rate on methane conversion as a function of flow rate for a disclosed method using microwave heating compared to conventional heating.
Figure 15A:
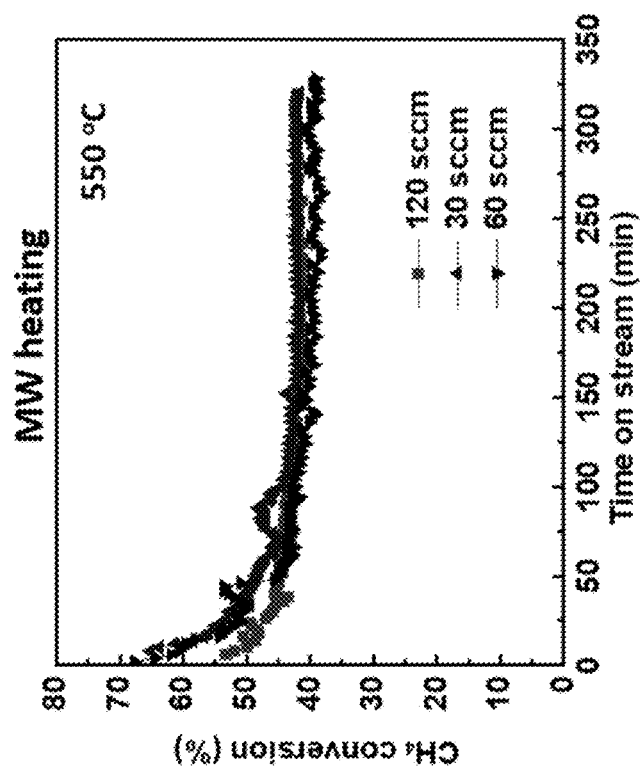

The effect of flow rate on methane conversion was assessed using the disclosed method as disclosed herein above. In this example, the catalyst was a 10Ni-1Pd/CNT catalyst as disclosed herein above and the feedstock comprised 30 vol % $CH_4$ in $N_2$. Briefly, the disclosed method was carried out the flow rate was varied from 30 sccm to 120 sccm. The data in FIGS. 15A-15B show that the flow rate hjad no effect in the disclosed method using microwave heating, whereas it was observed that conversion decreased when conventional heating was used. Moreover, it should be note that even at lower temperature of 550° C., the disclosed method using microwave heating resulted in higher conversion than conventional thermal heating at 600° C. Finally, the data show that the equilibrium conversion at 550° C. was 62% and at 600° C. was 75%.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A method for producing hydrogen from at least one hydrocarbon gas, the method comprising:
   (a) applying microwave radiation to the at least one hydrocarbon gas in the presence of a catalyst comprising metal atoms;
   (b) collecting the hydrogen;
   (c) contacting the catalyst and the at least one solid carbon product with an acid composition;
   (d) removing the metal atoms from the acid composition; and
   (e) removing the at least one solid carbon product from the acid composition;
   (f) using a portion of the at least one solid carbon product as a supporting solid carbon product to restart the method beginning at step (a);
   wherein the microwave radiation causes the at least one hydrocarbon gas to decompose into hydrogen and at least one solid carbon product;
   wherein the acid composition causes the metal atoms to separate from the at least one solid carbon product;
   wherein the at least one hydrocarbon gas comprises methane, ethane, propane, butane, or a combination thereof;
   wherein the catalyst comprises Ni, Co, Mo, Pt, Pd, Cu, Sn, Mn, or a combination thereof;
   wherein the catalyst comprises a support;
   wherein the support comprises a supporting solid carbon product, SiC, $SiO_2$, $TiO_2$, $ZrO_2$, an aerogel, a perovskite, or a combination thereof;
   wherein the at least one solid carbon product a comprises nanoparticles, fullerenes, carbon filaments, single-walled carbon nanotubes, multi-walled carbon nanotubes, carbon nanofibers, or a combination thereof; and
   wherein the supporting solid carbon product comprises nanoparticles, fullerenes, carbon filaments, single-walled carbon nanotubes, multi-walled carbon nanotubes, carbon nanofibers, or a combination thereof.

2. The method of claim 1, wherein the catalyst further comprises a dopant.

3. The method of claim 2, wherein the dopant comprises an alkali metal, an alkaline earth metal, a transition metal, or a combination thereof.

4. The method of claim 1, wherein the catalyst comprises an Ni—Pd, Ni—Cu, or Ni—Sn bimetallic catalyst and the support comprises a supporting solid carbon product.

5. The method of claim 1, wherein the catalyst comprises an Ni—Pd, Ni—Cu, or Ni—Sn bimetallic catalyst and the support comprises SiC.

6. The method of claim 1, wherein from about 5 wt % to about 90 wt % of the solid carbon product is used to restart the method at step (a).

7. The method of claim 1, wherein following step (c), the solid carbon product and the catalyst are contacted with a second acid composition.

8. The method of claim 7, wherein the second acid composition comprises concentrated nitric acid.

9. The method of claim 1, wherein the microwave radiation induces a temperature in the catalyst from about 400 to about 700° C.

10. The method of claim 1, wherein the method is performed at from about 1 to about 20 atm.

11. The method of claim 1, wherein the microwave radiation is applied at a power from about 20 W to about 10 MW.

12. The method of claim 1, wherein the microwave radiation has a frequency from about 915 MHz to about 20 GHz.

13. The method of claim 1, wherein the solid carbon product and the supporting solid carbon product independently comprise nanoparticles, fullerenes, carbon filaments, single-walled carbon nanotubes, multi-walled carbon nanotubes, carbon nanofibers, or a combination thereof.

14. The method of claim 13, wherein the solid carbon product and the supporting solid carbon product independently comprise single-walled carbon nanotubes, multi-walled carbon nanotubes, carbon nanofibers, or a combination thereof.

15. The method of claim 14, wherein the single-walled carbon nanotubes, multi-walled carbon nanotubes, or carbon nanofibers have an outer diameter from about 10 nm to about 500 nm.

16. The method of claim 14, wherein the single-walled carbon nanotubes, multi-walled carbon nanotubes, or carbon nanofibers have a length from about 50 nm to about 25 μm.

17. The method of claim 1, wherein in step (c), the acid composition comprises nitric acid.

18. The method of claim 1, wherein step (c) is carried out for from about 3 to about 5 hours at a temperature from about 110° C. to about 130° C.

19. The method of claim 1, wherein step (f) is repeated at least four times.

20. The method of claim 1, wherein the method is conducted in an inert atmosphere.

21. The method of claim 20, wherein the inert atmosphere comprises nitrogen, argon, or a combination thereof.

22. The method of claim 1, wherein the method is performed from about 1 atm to about 20 atm.

* * * * *